United States Patent
Fang et al.

(10) Patent No.: US 10,291,135 B2
(45) Date of Patent: *May 14, 2019

(54) SYSTEMS AND METHODS FOR REGULATING POWER CONVERSION SYSTEMS OPERATING IN QUASI-RESONANT MODE

(71) Applicant: ON-BRIGHT ELECTRONICS (SHANGHAI) CO., LTD., Shanghai (CN)

(72) Inventors: Qian Fang, Shanghai (CN); Huawei Lv, Shanghai (CN); Yuan Lin, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,936

(22) Filed: Oct. 31, 2017

(65) Prior Publication Data

US 2018/0102711 A1 Apr. 12, 2018

Related U.S. Application Data

(63) Continuation of application No. 14/861,077, filed on Sep. 22, 2015, now Pat. No. 9,847,728.

(30) Foreign Application Priority Data

Aug. 20, 2015 (CN) .......................... 2015 1 0514528

(51) Int. Cl.
*H02M 3/335* (2006.01)
*H02M 1/00* (2006.01)

(52) U.S. Cl.
CPC ............... *H02M 3/33523* (2013.01); *H02M 2001/0032* (2013.01); *H02M 2001/0054* (2013.01);
(Continued)

(58) Field of Classification Search
CPC ..... H02M 3/33507; H02M 2007/4815; H02M 2007/4818; H02M 1/083; H02M 3/33538; H02M 3/33546; H02M 3/33515
See application file for complete search history.

(56) References Cited

U.S. PATENT DOCUMENTS 9,847,728 B2 * 12/2017 Fang ................. H02M 3/33523
2013/0033905 A1 2/2013 Lin et al.
(Continued)

FOREIGN PATENT DOCUMENTS

CN 102946197 A 2/2013
CN 103414350 A 11/2013
(Continued)

OTHER PUBLICATIONS

China Patent Office, Office Action dated Mar. 17, 2017, in Application No. 201510514528.5.
(Continued)

*Primary Examiner* — Gary L Laxton
*Assistant Examiner* — Afework S Demisse
(74) *Attorney, Agent, or Firm* — Faegre Baker Daniels LLP

(57) ABSTRACT

Systems and methods are provided for power conversion system regulation. A system controller includes: a first signal processing component configured to receive a first signal associated with an auxiliary winding of a power conversion system and generate a second signal based at least in part on the first signal, the power conversion system further including a primary winding and a secondary winding; and a drive
(Continued)

component configured to receive the second signal and output a drive signal to open or close a switch to affect a current flowing through the primary winding. The first signal processing component is further configured to: detect a plurality of valleys of the first signal, the plurality of valleys corresponding to a same demagnetization process of the power conversion system; select a valley from the plurality of valleys; and change the second signal at the selected valley.

39 Claims, 18 Drawing Sheets

(52) U.S. Cl.
CPC ....... *Y02B 70/1433* (2013.01); *Y02B 70/1491* (2013.01); *Y02B 70/16* (2013.01)

(56) References Cited

U.S. PATENT DOCUMENTS

| | | | |
|---|---|---|---|
| 2013/0121049 A1 | 5/2013 | Shi et al. | |
| 2017/0054374 A1 | 2/2017 | Fang et al. | |

FOREIGN PATENT DOCUMENTS

| | | | |
|---|---|---|---|
| CN | 103701316 A | 4/2014 |
| CN | 103840673 A | 6/2014 |
| CN | 103956900 A | 7/2014 |
| CN | 104660022 A | 5/2015 |
| JP | 2000286083 A | 10/2000 |
| TW | 201411995 A | 3/2014 |

OTHER PUBLICATIONS

Taiwan Patent Office, Office Action dated Aug. 24, 2016, in Application No. 104137190.

\* cited by examiner

SYSTEMS AND METHODS FOR REGULATING POWER CONVERSION SYSTEMS OPERATING IN QUASI-RESONANT MODE

1. CROSS-REFERENCES TO RELATED APPLICATIONS

This application is a continuation of U.S. patent application Ser. No. 14/861,077, filed Sep. 22, 2015, which claims priority to Chinese Patent Application No. 201510514528.5, filed Aug. 20, 2015, both applications being incorporated by reference herein for all purposes.

2. BACKGROUND OF THE INVENTION

Certain embodiments of the present invention are directed to integrated circuits. More particularly, some embodiments of the invention provide a system and method for regulating power conversion systems. Merely by way of example, some embodiments of the invention have been applied to power conversion systems operating in a quasi-resonant mode. But it would be recognized that the invention has a much broader range of applicability.

FIG. 1 is a simplified diagram showing a conventional flyback power conversion system. The power conversion system 100 includes a primary winding 108, a secondary winding 110, an auxiliary winding 112, a power switch 106, a current sensing resistor 104, two diodes 114 and 116, capacitors 118, 120 and 126, a rectifying bridge 128, resistors 130, 132 and 134, a system controller 102, an AND gate 172, an OR gate 174, and an isolated feedback component 103. The isolated feedback component 103 includes resistors 136, 138, 140 and 142, capacitors 122, 124 and 146, a three-terminal regulator 143, and an opto-coupler 144. The system controller 102 includes a resistor 148, a comparator 150, a demagnetization detector 152, and a flip-flop component 154. For example, the power switch 106 includes a bipolar junction transistor. In another example, the power switch 106 includes a field effect transistor (e.g., a metal-oxide-semiconductor field effect transistor). In yet another example, the power switch 106 includes an insulated-gate bipolar transistor.

As shown in FIG. 1, the power conversion system 100 uses a transformer including the primary winding 108 and the secondary winding 110 to isolate a primary side and a secondary side of the power conversion system 100. Information related to an output voltage 156 on the secondary side can be extracted through a voltage divider including the resistors 138 and 142. A feedback signal 158 is generated based on information related to the output voltage 156. The controller 102 receives the feedback signal 158, and generates a drive signal 160 to turn on and off the switch 106 in order to regulate the output voltage 156.

If the power switch 106 is closed (e.g., on), the energy is stored in the transformer including the primary winding 108 and the secondary winding 110. Then, if the power switch 106 is open (e.g., off), the stored energy is released to an output terminal 166, and the system 100 enters a demagnetization process. A signal 198 (e.g., INV) maps a winding voltage 196 of the auxiliary winding 112 through a voltage divider including the resistors 132 and 134. The demagnetization detector 152 detects the demagnetization process using the signal 198, and outputs a detection signal 194 to the AND gate 172 which also receives a signal 173 associated with a maximum operating frequency of the system 100. The OR gate 174 receives a signal 175 from the AND gate 172 and a signal 176 associated with a minimum operating frequency of the system 100 and outputs a signal 178 to the flip-flop component 154 (e.g., at terminal S). The comparator 150 receives a current sensing signal 192 and the feedback signal 158 and outputs a comparison signal 190 to the flip-flop component 154 (e.g., at terminal R).

Upon the completion of the demagnetization process (e.g., the stored energy being completely released to the output terminal 166), series resonance occurs between the primary winding 108 and a parasitic capacitor 168 of the power switch 106. If a voltage drop of the capacitor 168 reaches a local minimum value (e.g., the voltage drop between the terminals of the power switch 106 reaching the local minimum value) during the series resonance, the system controller 102 changes the drive signal 160 to close (e.g., turn on) the power switch 106. The switching loss of the switch 106 is reduced and the efficiency of the power conversion system 100 is improved. For example, a switching period of the switch 106 includes an on-time period during which the switch 106 is closed (e.g., on) and an off-time period during which the switch 106 is open (e.g., off).

FIG. 2 is a simplified conventional timing diagram for the flyback power conversion system 100 that operates in the quasi-resonant (QR) mode. The waveform 202 represents the drive signal 160 as a function of time, the waveform 203 represents the feedback signal 158 as a function of time, the waveform 204 represents the current sensing signal 192 as a function of time, the waveform 206 represents the signal 198 as a function of time, and the waveform 208 represents the detection signal 194 as a function of time. For example, $t_0 \leq t_1 \leq t_2$.

During a time period between $t_0$ and $t_1$, the drive signal 160 is at a logic high level (e.g., as shown by the waveform 202), and the power switch 106 is closed (e.g., on). An input voltage 186 applies on the primary winding 108, and a current 188 flows through the primary winding 108. The current sensing signal 192 increases in magnitude (e.g., as shown by the waveform 204). The signal 198 keeps at a low magnitude (e.g., 0), and the detection signal 194 keeps at a low magnitude (e.g., 0).

At $t_1$, the current sensing signal 192 reaches the feedback signal 158 (e.g., as shown by the waveforms 203 and 204), and the comparator 150 changes the comparison signal to the logic high level. In response, the drive signal 160 changes from the logic high level to a logic low level (e.g., as shown by the waveform 202), and the power switch 106 is opened (e.g., being turned off). The current sensing signal 192 decreases rapidly to a low magnitude (e.g., 0). The signal 198 (e.g., INV) which is associated with the winding voltage 196 of the auxiliary winding 112 increases rapidly to a magnitude 210 (e.g., as shown by the waveform 206). The system 100 enters the demagnetization process.

After the completion of the demagnetization process, the series resonance occurs between the primary winding 108 and the parasitic capacitor 168 of the power switch 106. At $t_2$, the signal 198 (e.g., INV) changes to a local minimum magnitude 212 (e.g., as shown by the waveform 206), and a pulse is generated in the detection signal 194 by the demagnetization detector 152 (e.g., as shown by the waveform 208). In response, the drive signal 160 changes from the logic low level to the logic high level (e.g., as shown by the waveform 202), and the power switch 106 is closed (e.g., being turned on) again.

The system 100 may not solve many problems related to system control in the quasi-resonant mode, such as noises.

Hence it is highly desirable to improve the techniques of regulating power conversion systems operating in the quasi-resonant mode.

3. BRIEF SUMMARY OF THE INVENTION

Certain embodiments of the present invention are directed to integrated circuits. More particularly, some embodiments of the invention provide a system and method for regulating power conversion systems. Merely by way of example, some embodiments of the invention have been applied to power conversion systems operating in a quasi-resonant mode. But it would be recognized that the invention has a much broader range of applicability.

According to one embodiment, a system controller for regulating a power conversion system includes: a first signal processing component configured to receive a first signal associated with an auxiliary winding of a power conversion system and generate a second signal based at least in part on the first signal, the power conversion system further including a primary winding and a secondary winding; and a drive component configured to receive the second signal and output a drive signal to open or close a switch to affect a current flowing through the primary winding. The first signal processing component is further configured to: detect a plurality of valleys of the first signal, the plurality of valleys corresponding to a same demagnetization process of the power conversion system; select a valley from the plurality of valleys; and change the second signal at the selected valley. The drive component is further configured to change the drive signal based on at least information associated with the selected valley in order to close the switch.

According to another embodiment, a system controller for regulating a power conversion system includes: a first signal processing component configured to receive a first signal associated with an auxiliary winding of a power conversion system and generate a second signal based at least in part on the first signal, the power conversion system further including a primary winding and a secondary winding; a second signal processing component configured to receive a third signal associated with an output signal of the power conversion system and generate a fourth signal based at least in part on the third signal, the fourth signal indicating a first time period; and a drive component configured to receive the second signal and the fourth signal and output a drive signal to open or close a switch to affect a current flowing through the primary winding. The first signal processing component is further configured to: determine a first group of one or more valleys of the first signal, the first group of one or more valleys corresponding to a first group of one or more demagnetization periods of the power conversion system respectively; and change the second signal at each valley of the first group of one or more valleys. The drive component is further configured to: keep the drive signal unchanged during the first time period indicated by the fourth signal in order to keep the switch open; and change the drive signal based on at least information associated with the first group of one or more valleys outside the first time period in order to close the switch.

According to yet another embodiment, a system controller for regulating a power conversion system includes: a first signal processing component configured to receive a first signal associated with an auxiliary winding of a power conversion system and generate a second signal based at least in part on the first signal; a second signal processing component configured to receive a third signal and generate a fourth signal based at least in part on the third signal, the third signal being associated with an output signal of the power conversion system, the fourth signal indicating a plurality of time periods; a third signal processing component configured to receive the third signal and generate a fifth signal based at least in part on the third signal, the fifth signal indicating an off time period, the off time period not overlapping with the plurality of time periods; and a drive component configured to receive the second signal, the fourth signal and the fifth signal and to output a drive signal to open or close a switch to affect a current flowing through the primary winding. The first signal processing component is further configured to: determine a first group of one or more valleys of the first signal, the first group of one or more valleys corresponding to a first group of one or more demagnetization periods of the power conversion system respectively; and change the second signal at each valley of the group of one or more valleys. The drive component is further configured to: keep the drive signal unchanged during the plurality of time periods indicated by the fourth signal in order to keep the switch open; keep the drive signal unchanged during the off time period indicated by the fifth signal in order to keep the switch open; and change the drive signal based on at least information associated with the first group of one or more valleys outside the plurality of time periods and outside the off time period in order to close the switch.

In one embodiment, a method for regulating a power conversion system includes: receiving a first signal; generating a second signal based at least in part on the first signal; receiving the second signal; and outputting a drive signal based at least in part on the second signal. The generating the second signal based at least in part on the first signal includes: detecting a plurality of valleys of the first signal, the plurality of valleys corresponding to a same demagnetization process; selecting a valley from the plurality of valleys; and changing the second signal at the selected valley. The outputting the drive signal based at least in part on the second signal includes changing the drive signal based on at least information associated with the selected valley.

In another embodiment, a method for regulating a power conversion system includes: receiving a first signal; generating a second signal based at least in part on the first signal; receiving a third signal; generating a fourth signal based at least in part on the third signal, the fourth signal indicating a first time period; receiving the second signal and the fourth signal; and outputting a drive signal based at least in part on the second signal and the fourth signal. The generating the second signal based at least in part on the first signal includes: determining a first group of one or more valleys of the first signal, the first group of one or more valleys corresponding to a first group of one or more demagnetization periods respectively; and changing the second signal at each valley of the first group of one or more valleys. The outputting the drive signal based at least in part on the second signal and the fourth signal includes: keeping the drive signal unchanged during the first time period indicated by the fourth signal; and changing the drive signal based on at least information associated with the first group of one or more valleys outside the first time period.

In yet another embodiment, a method for regulating a power conversion system includes: receiving a first signal; generating a second signal based at least in part on the first signal; receiving a third signal; generating a fourth signal based at least in part on the third signal, the fourth signal indicating a plurality of time periods; generating a fifth signal based at least in part on the third signal, the fifth signal indicating an off time period, the off time period not overlapping with the plurality of time periods; receiving the second signal, the fourth signal, and the fifth signal; and outputting a drive signal based at least in part on the second signal, the fourth signal and the fifth signal. The generating the second signal based at least in part on the first signal includes: determining a first group of one or more valleys of the first signal, the first group of one or more valleys corresponding to a first group of one or more demagnetization periods respectively; and changing the second signal at each valley of the group of one or more valleys. The outputting the drive signal based at least in part on the second signal includes: keeping the drive signal unchanged during the plurality of time periods indicated by the fourth signal; keeping the drive signal unchanged during the off time period indicated by the fifth signal; and changing the drive signal based on at least information associated with the first group of one or more valleys outside the plurality of time periods and outside the off time period.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide a system and method for regulating power conversion systems. Merely by way of example, some embodiments of the invention have been applied to power conversion systems operating in a quasi-resonant mode. But it would be recognized that the invention has a much broader range of applicability.

Figure 1:
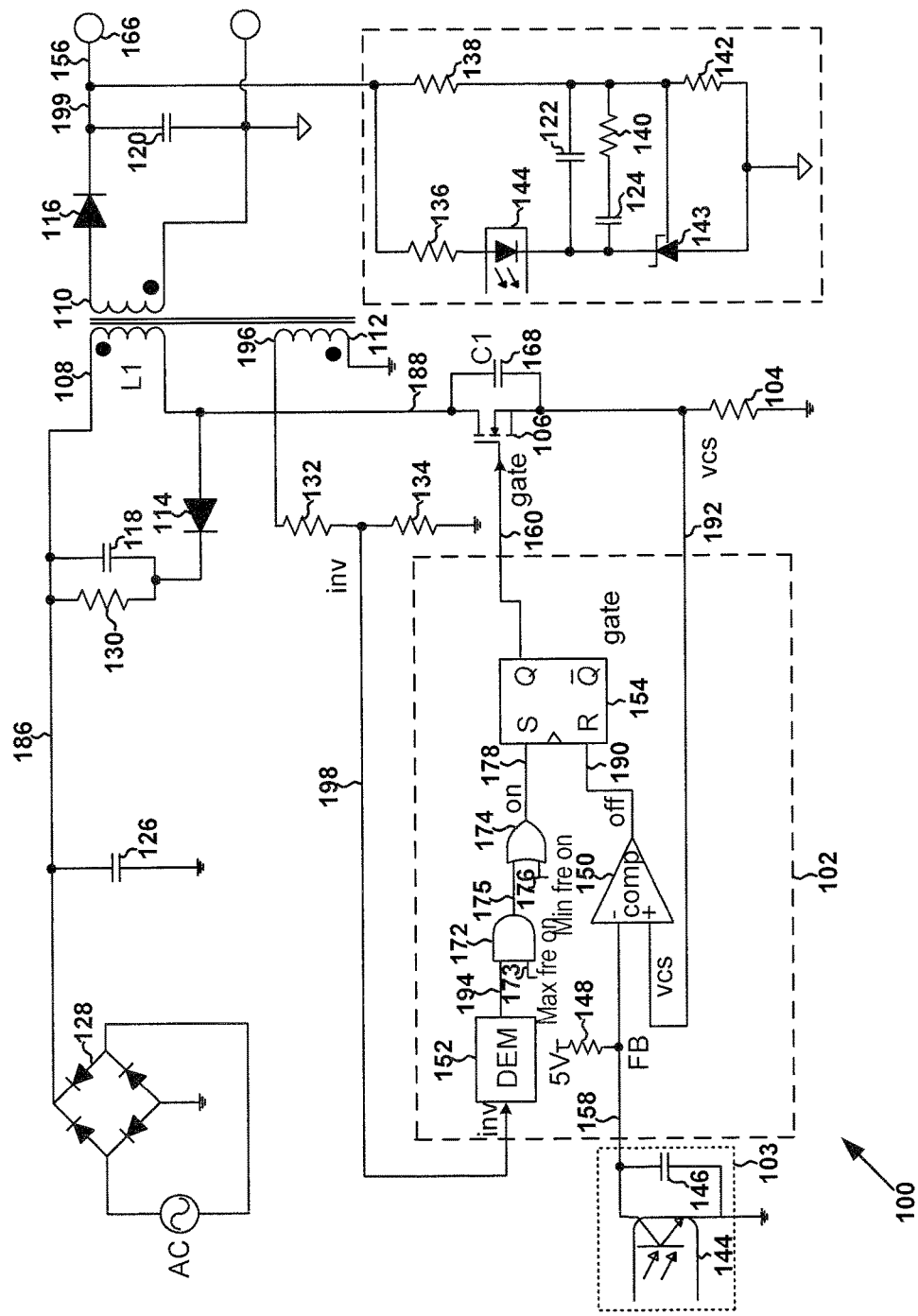
FIG. 1 is a simplified diagram showing a conventional flyback power conversion system.
Figure 2:
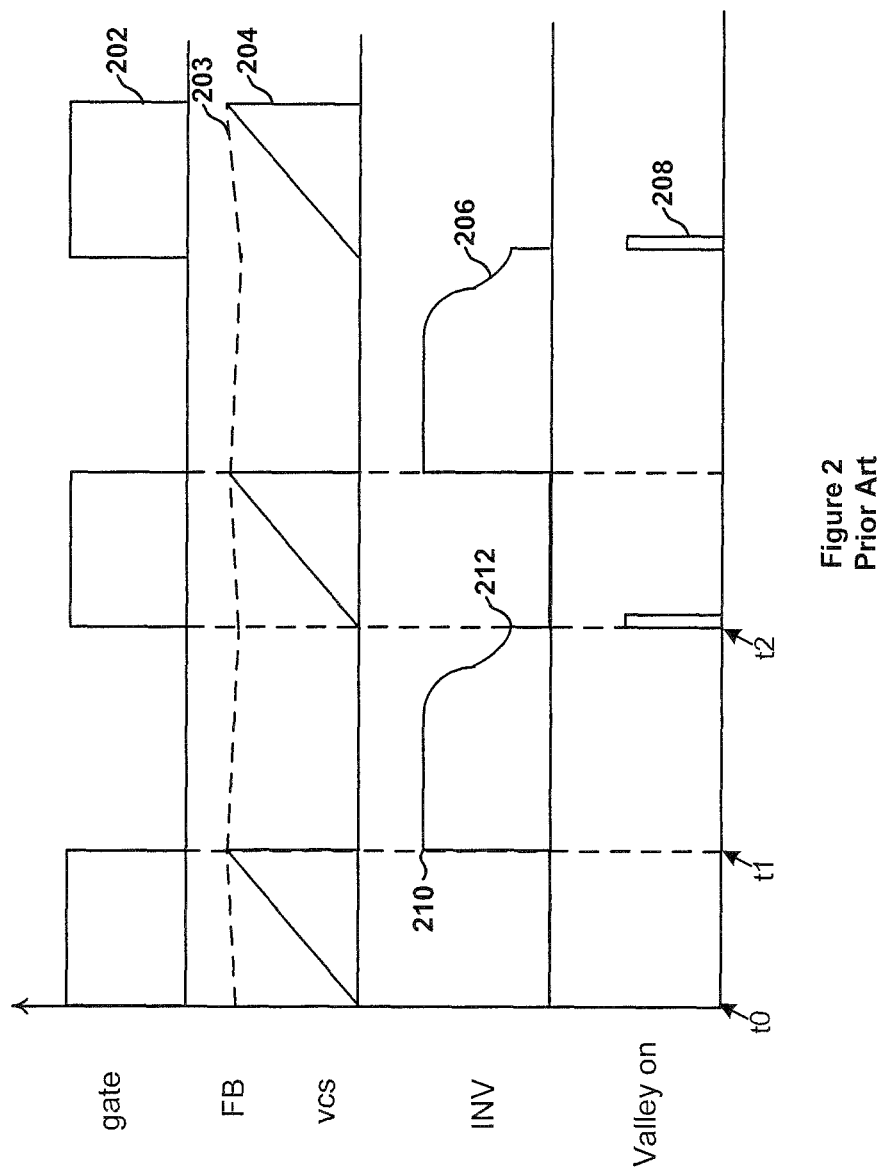
FIG. 2 is a simplified conventional timing diagram for the flyback power conversion system as shown in FIG. 1 that operates in the quasi-resonant (QR) mode.

As shown in FIG. 1 and FIG. 2, the power switch 106 is closed (e.g., being turned on) at a first valley in the signal 198 which is related to a winding voltage 196 of the auxiliary winding 112, and the system 100 operates at a fixed frequency under full output load (e.g., an output current 199 reaching a maximum magnitude). It is often difficult to achieve frequency jittering. In addition, the system 100 may have noise problems, as illustrated in FIG. 3.

Figure 3:
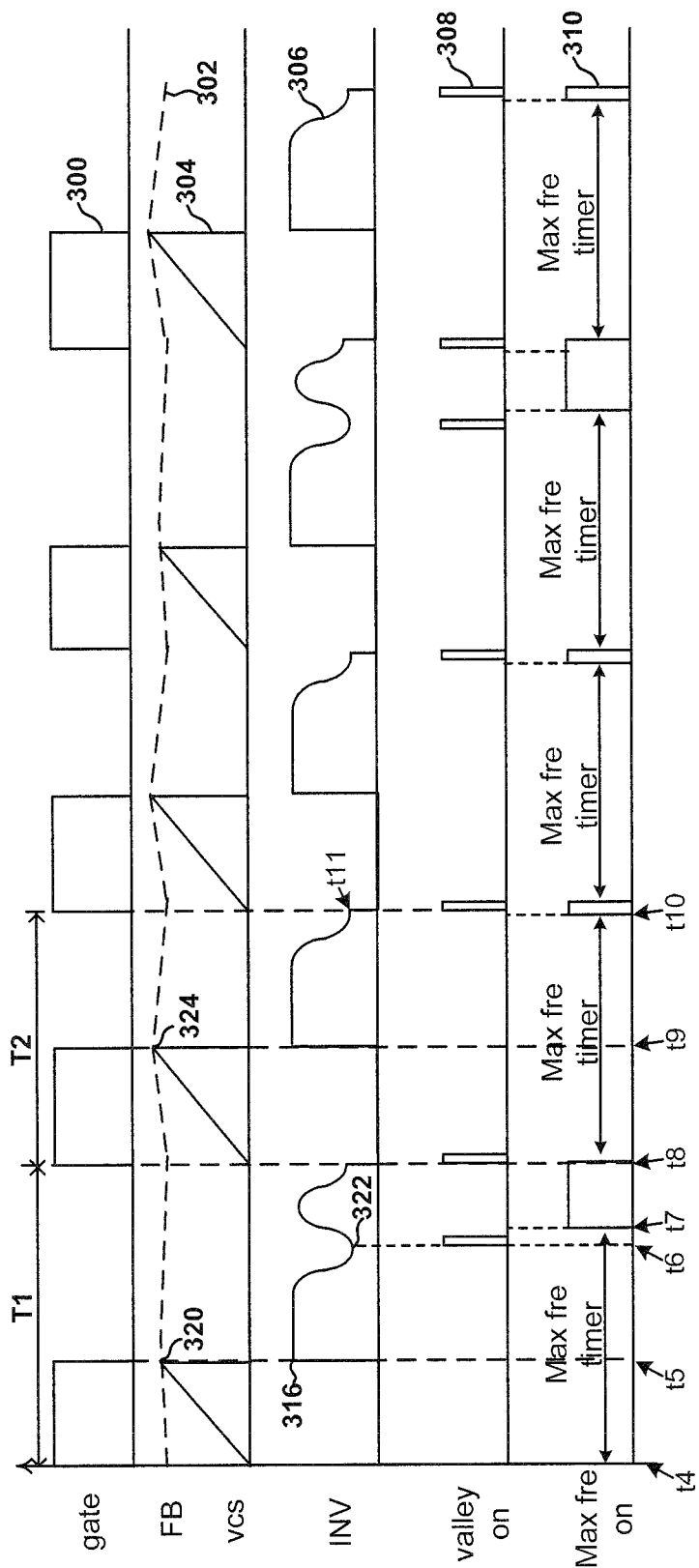
FIG. 3 is a simplified timing diagram for the flyback power conversion system as shown in FIG. 1 that operates in the quasi-resonant (QR) mode, showing that fluctuation of a feedback signal causes a power switch to conduct at different valleys of a signal associated with an auxiliary winding.

FIG. 3 is a simplified timing diagram for the flyback power conversion system 100 that operates in the quasi-resonant (QR) mode, showing that fluctuation of the feedback signal 158 causes the power switch 106 to conduct at different valleys of the signal 198. The waveform 300 represents the drive signal 160 as a function of time, the waveform 302 represents the feedback signal 158 as a function of time, and the waveform 304 represents the current sensing signal 192 as a function of time. In addition, the waveform 306 represents the signal 198 as a function of time, the waveform 308 represents the detection signal 194 as a function of time, and the waveform 310 represents the signal 173 associated with the maximum operating frequency of the system 100. For example, $t_4 \leq t_5 \leq t_6 \leq t_7 \leq t_8 \leq t_9 \leq t_{10} \leq t_{11}$.

As the output load reduces, the maximum operating frequency of the system 100 decreases. The feedback signal 158 often fluctuates, which may cause the power switch 106 to conduct at different valleys of the signal 198 to cause noises. Specifically, as shown in FIG. 3, during a time period $T_1$ between $t_4$ and $t_5$, the drive signal 160 is at the logic high level (e.g., as shown by the waveform 300), and the power switch 106 is closed (e.g., on). The current sensing signal 192 increases in magnitude (e.g., as shown by the waveform 304). The signal 198 keeps at a low magnitude (e.g., 0) as shown by the waveform 306, and the detection signal 194 keeps at a low magnitude (e.g., 0) as shown by the waveform 308.

At $t_5$, the current sensing signal 192 reaches the feedback signal 158 (e.g., as shown by the waveforms 302 and 304), and the comparator 150 changes the comparison signal to the logic high level. In response, the drive signal 160 changes from the logic high level to the logic low level (e.g., as shown by the waveform 300), and the power switch 106 is opened (e.g., being turned off). The current sensing signal 192 decreases rapidly to a low magnitude (e.g., 0) as shown by the waveform 304. The signal 198 (e.g., INV) increases rapidly to a magnitude 316 (e.g., as shown by the waveform 306). The system 100 enters the demagnetization process. After the completion of the demagnetization process, the series resonance occurs between the primary winding 108 and the parasitic capacitor 168 of the power switch 106. At $t_6$, the signal 198 (e.g., INV) changes to a local minimum magnitude 322 (e.g., a first valley as shown by the waveform 306), and a pulse is generated in the detection signal 194 by the demagnetization detector 152 (e.g., as shown by the waveform 308).

If the feedback signal 158 has a small magnitude, the peak magnitude 320 of the current sensing signal 192 is small. Also, the on-time period associated with the power switch 106 and the demagnetization period are relatively short. A time period corresponding to the maximum operating frequency begins at $t_4$ and ends at $t_7$ which is later than the first valley in the signal 198 (e.g., at $t_6$). The drive signal 160 changes from the logic low level to the logic high level at a second valley in the signal 198 (e.g., at $t_8$), instead of at the first valley (e.g., at $t_6$), as shown by the waveform 300.

In the subsequent switching period $T_2$ of the power switch 106 (e.g., between $t_8$ and $t_{11}$), the feedback signal 158 has a relatively larger magnitude, and the peak magnitude 324 of the current sensing signal 192 is relatively larger. Also, the on-time period associated with the power switch 106 and the demagnetization period become relatively longer. During $T_2$, the maximum operating frequency may increase with the feedback signal 158. The time period corresponding to the maximum operating frequency begins at $t_8$ and ends at $t_{10}$ which is earlier than a first valley in the signal 198 (e.g., at $t_{11}$). The drive signal 160 changes from the logic low level to the logic high level at the first valley in the signal 198 (e.g., at $t_{11}$) as shown by the waveform 300. As described above, the power switch 106 is closed (e.g., being turned on) at different valleys during different switching periods, and thus the operating frequency of the system 100 fluctuates to cause noises (e.g., low frequency noises).

Figure 4:
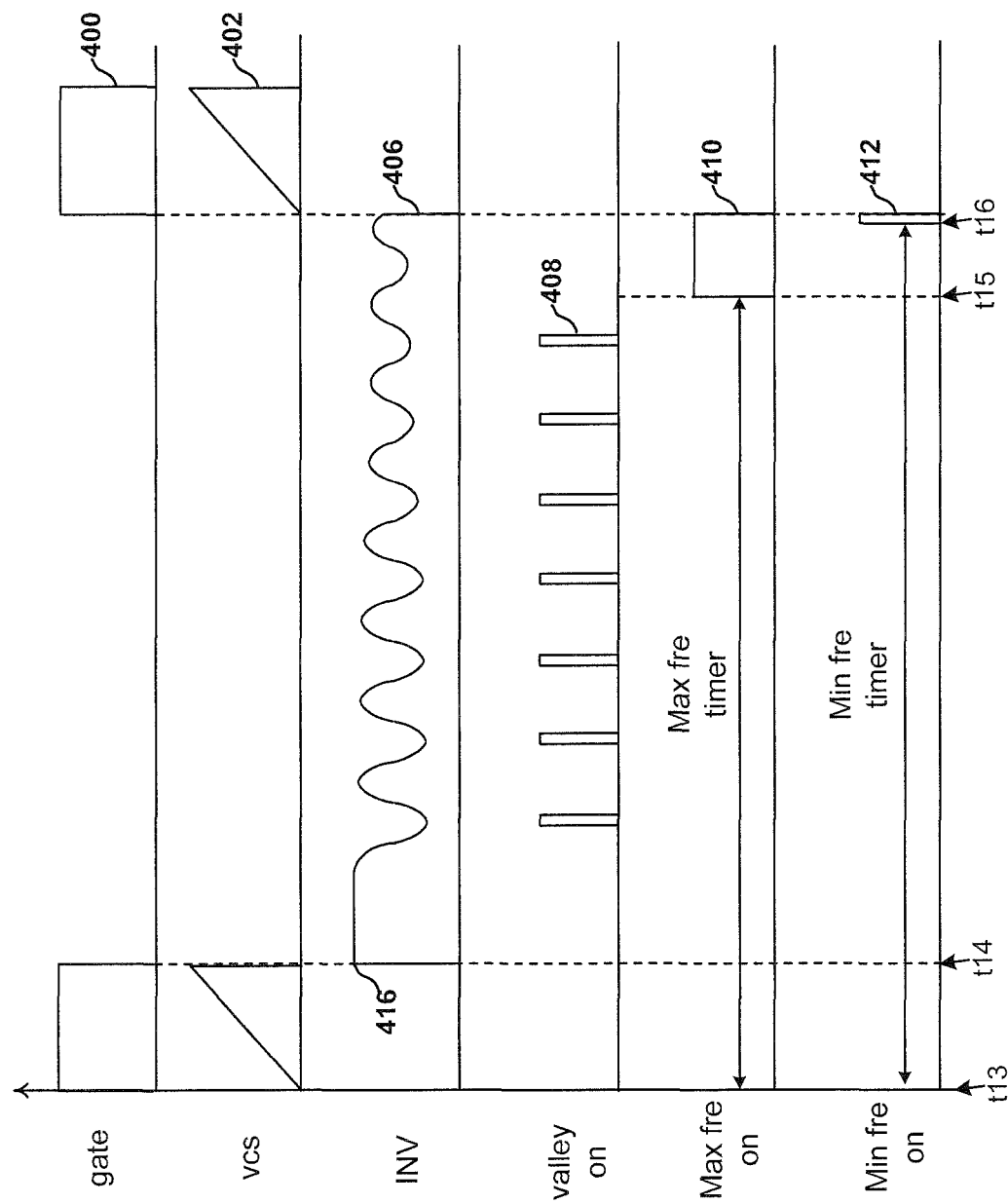
FIG. 4 is a simplified timing diagram for the flyback power conversion system as shown in FIG. 1 that operates in the quasi-resonant (QR) mode, showing that valley conduction may not be achieved if the output load is reduced to a certain degree.

FIG. 4 is a simplified timing diagram for the flyback power conversion system 100 that operates in the quasi-resonant (QR) mode, showing that valley conduction may not be achieved if the output load is reduced to a certain degree. The waveform 400 represents the drive signal 160 as a function of time, the waveform 402 represents the current sensing signal 192 as a function of time, the waveform 406 represents the signal 198 as a function of time, the waveform 408 represents the detection signal 194 as a function of time, the waveform 410 represents the signal 173 associated with the maximum operating frequency of the system 100, and the waveform 412 represents the signal 176 associated with the minimum operating frequency of the system 100. For example, $t_{13} \leq t_{14} \leq t_{15} \leq t_{16}$.

If the output load is reduced to a certain degree, the maximum operating frequency of the system 100 continues to decrease, and the valley conduction may not be achieved. Specifically, as shown in FIG. 4, during an on-time period between $t_{13}$ and $t_{14}$, the drive signal 160 is at the logic high level (e.g., as shown by the waveform 400), and the power switch 106 is closed (e.g., on). The current sensing signal 192 increases in magnitude (e.g., as shown by the waveform 402). The signal 198 keeps at a low magnitude (e.g., 0) as shown by the waveform 406, and the detection signal 194 keeps at a low magnitude (e.g., 0) as shown by the waveform 408.

At $t_{14}$, the drive signal 160 changes from the logic high level to the logic low level (e.g., as shown by the waveform 400), and the power switch 106 is opened (e.g., being turned off). The current sensing signal 192 decreases rapidly to a low magnitude (e.g., 0) as shown by the waveform 402. The signal 198 (e.g., INV) increases rapidly to a magnitude 416 (e.g., as shown by the waveform 406). The system 100 enters the demagnetization process. After the completion of the demagnetization process, the series resonance occurs between the primary winding 108 and the parasitic capacitor 168 of the power switch 106.

As shown in FIG. 4, the maximum operating frequency decreases to a low magnitude (e.g., below 35 kHz), and thus the switch 106 may not conduct until many valleys (e.g., seven valleys) in the signal 198 have passed. Then, the magnitude of the series resonance may have decreased to a low magnitude (e.g., as shown by the waveform 406). It becomes difficult to detect the valleys of the signal 198, and then the switch 106 can conduct only in response to the signal 176 associated with the minimum operating frequency of the system 100. Particularly, a time period corresponding to the maximum operating frequency begins at $t_{13}$ and ends at $t_{15}$. Another time period corresponding to the minimum operating frequency begins at $t_{13}$ and ends at $t_{16}$ which is later than $t_{15}$. The drive signal 160 changes from the logic low level to the logic high level at $t_{16}$ (e.g., as shown by the waveform 400). As such, the valley conduction is not achieved.

Figure 5:
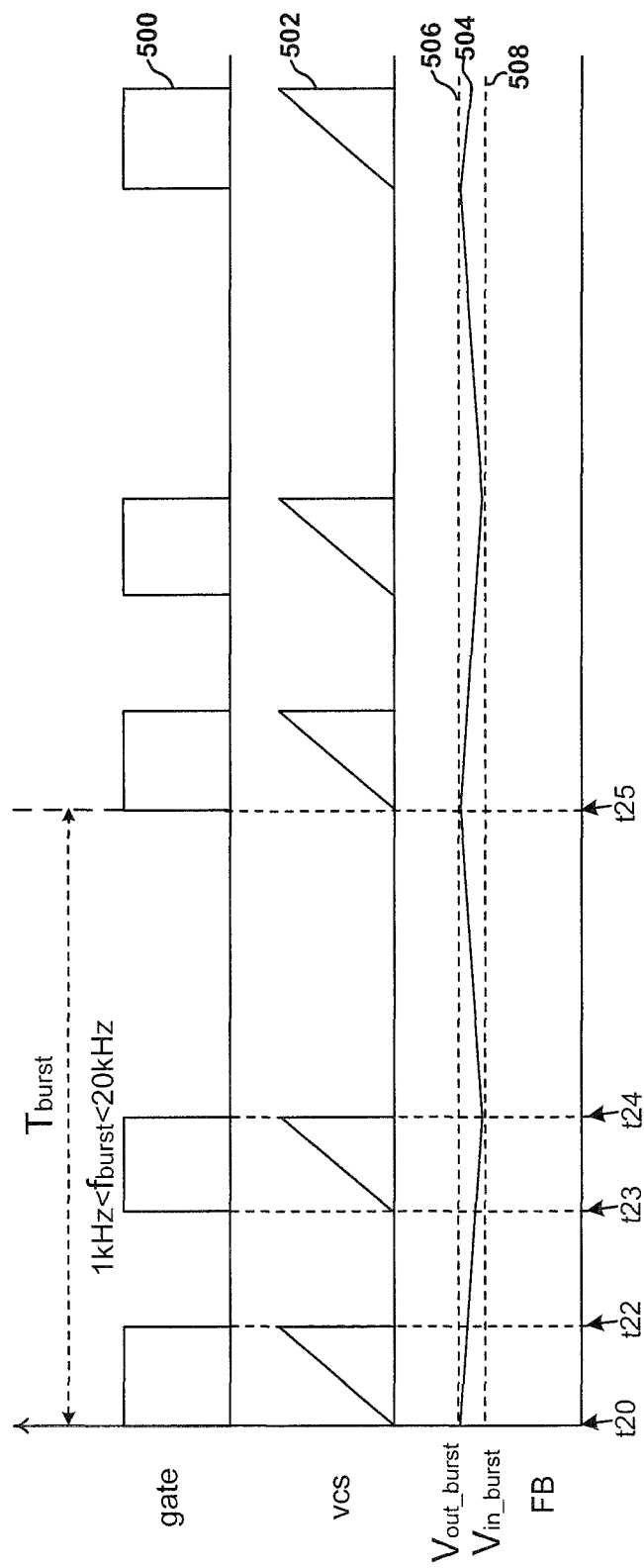
FIG. 5 is a simplified timing diagram for the flyback power conversion system as shown in FIG. 1 that operates in the quasi-resonant (QR) mode, showing a burst frequency may become smaller than 20 kHz but larger than 1 kHz.

If the output load of the system 100 decreases to a very low magnitude (e.g., lower than 10% of the full load), the system 100 enters a burst operating mode (e.g., as illustrated in FIG. 5).

FIG. 5 is a simplified timing diagram for the flyback power conversion system 100 that operates in the quasi-resonant (QR) mode, showing a burst frequency may become smaller than 20 kHz but larger than 1 kHz. The waveform 500 represents the drive signal 160 as a function of time, the waveform 502 represents the current sensing signal 192 as a function of time, and the waveform 504 represents the feedback signal 158 as a function of time. For example, $t_{20} \leq t_{21} \leq t_{22} \leq t_{23} \leq t_{24} \leq t_{25}$.

As shown in FIG. 5, between $t_{20}$ and $t_{24}$, the feedback signal 158 decreases in magnitude, and the switch 106 opens and closes at a switching frequency in response to the drive signal 160. At $t_{24}$, the feedback signal 158 becomes equal to or smaller than a lower threshold 508 (e.g., $V_{in\_burst}$) in magnitude, and the drive signal 160 changes to the logic low level. Between $t_{24}$ and $t_{25}$, the drive signal 160 remains at the logic low level, and the feedback signal 158 increases in magnitude. At $t_{25}$, the feedback signal 158 becomes equal to or larger than a higher threshold 506 (e.g., $V_{out\_burst}$) in magnitude, and the power switch 106 opens and closes at the switching frequency in response to the drive signal 160. As an example, the switching frequency is no smaller than 20 kHz, and a burst frequency corresponding to a burst period (e.g., between $t_{20}$ and $t_{25}$) is smaller than 20 kHz but larger than 1 kHz. As the burst frequency is within an audible frequency range, audible noises may be generated. In addition, valley conduction cannot be achieved and thus the system efficiency is low.

Figure 6:
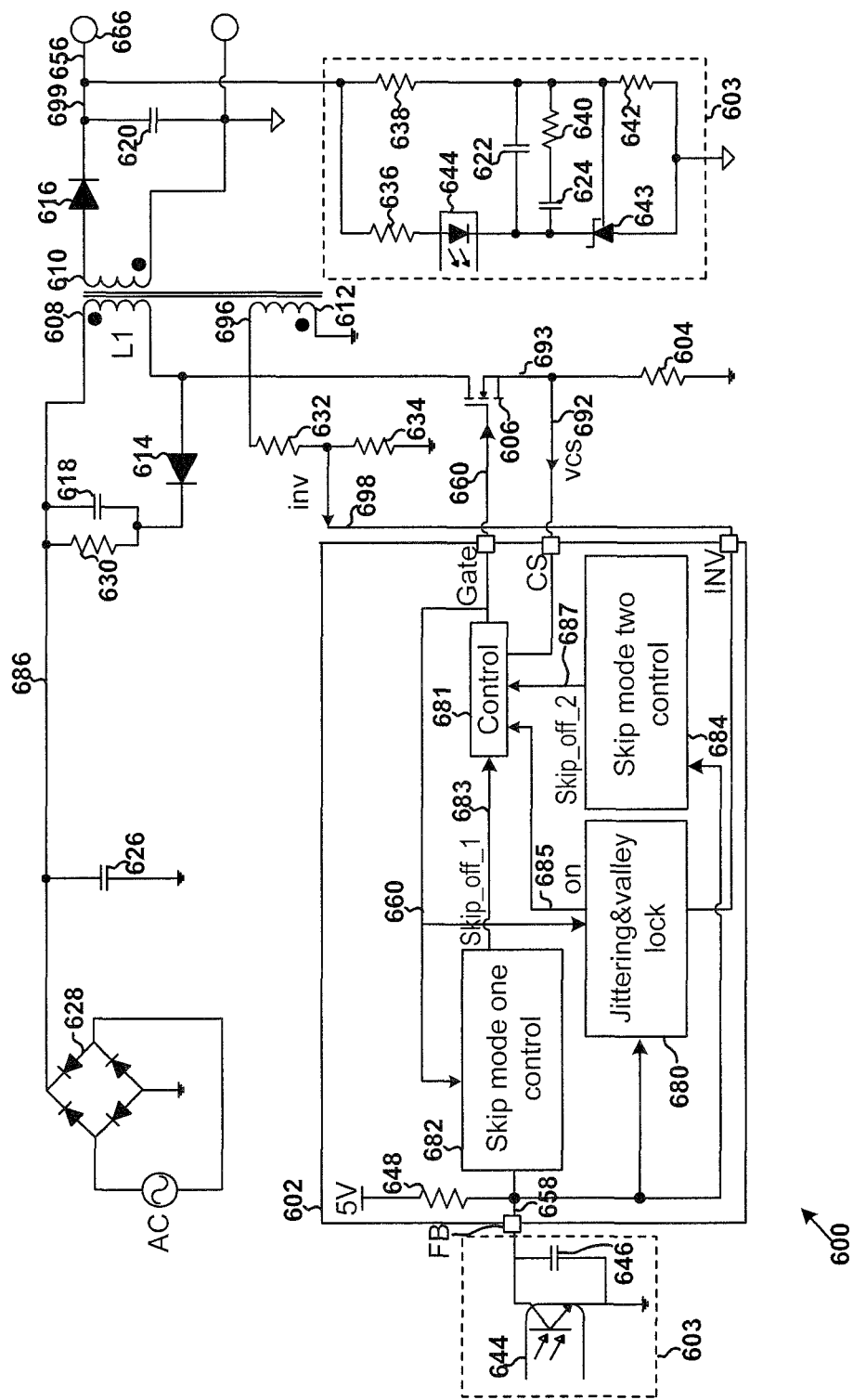
FIG. 6 is a simplified diagram showing a power conversion system according to an embodiment of the present invention.

FIG. 6 is a simplified diagram showing a power conversion system according to an embodiment of the present invention. This diagram is merely an example, which should not unduly limit the scope of the claims. One of ordinary skill in the art would recognize many variations, alternatives, and modifications.

The power conversion system 600 includes a primary winding 608, a secondary winding 610, an auxiliary winding 612, a power switch 606, a current sensing resistor 604, two diodes 614 and 616, capacitors 618, 620 and 626, a rectifying bridge 628, resistors 630, 632 and 634, a system controller 602, a drive component 681, and an isolated feedback component 603. The isolated feedback component 603 includes resistors 636, 638, 640 and 642, capacitors 622, 624 and 646, a three-terminal regulator 643, and an optocoupler 644. The system controller 602 includes a resistor 648, a valley-jittering component 680, a first frequency-skipping component 682, and a second frequency-skipping component 684. For example, the power switch 606 includes a bipolar junction transistor. In another example, the power switch 606 includes a field effect transistor (e.g., a metal-oxide-semiconductor field effect transistor). In yet another example, the power switch 606 includes an insulated-gate bipolar transistor.

As shown in FIG. 6, the power conversion system 600 uses a transformer including the primary winding 608 and the secondary winding 610 to isolate a primary side and a secondary side of the power conversion system 600, according to some embodiments. For example, information related to an output voltage 656 on the secondary side can be extracted through a voltage divider including the resistors 638 and 642. In another example, a feedback signal 658 is generated based on information related to the output voltage 656. As an example, the controller 602 receives the feedback signal 658 (e.g., at terminal FB), and generates a drive signal 660 (e.g., at terminal Gate) to turn on and off the switch 606 in order to regulate the output voltage 656. In another example, if the power switch 606 is closed (e.g., on), the energy is stored in the transformer including the primary winding 608 and the secondary winding 610. In yet another example, if the power switch 606 is open (e.g., off), the stored energy is released to an output terminal 666, and the system 600 enters a demagnetization process. In yet another example, a signal 698 (e.g., INV) maps a winding voltage 696 of the auxiliary winding 612 through a voltage divider including the resistors 632 and 634.

According to another embodiment, upon the completion of the demagnetization process (e.g., the stored energy being completely released to the output terminal 666), series resonance occurs between the primary winding 608 and a parasitic capacitor of the power switch 606. For example, if a voltage drop of the parasitic capacitor reaches a local minimum value during the series resonance (e.g., the voltage drop between the terminals of the power switch 606 reaching the local minimum value), the system controller 602 changes the drive signal 660 to close (e.g., turn on) the power switch 606. In another example, a switching period of the switch 606 includes an on-time period during which the switch 606 is closed (e.g., on) and an off-time period during which the switch 606 is open (e.g., off). In yet another example, the controller 602 receives the signal 698 (e.g., at terminal INV) and a current sensing signal 692 (e.g., at terminal CS) associated with a current 693 that flows through the power switch 606 during the on-time period.

Figure 7A:
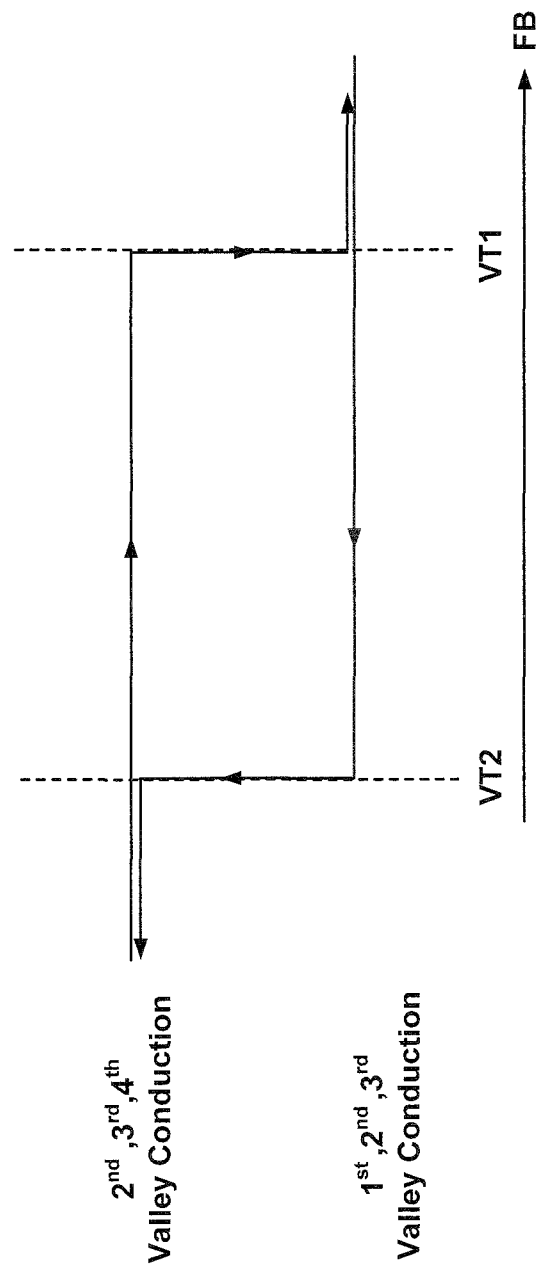
FIG. 7(A) is a simplified diagram showing sub-modes of a valley jittering mode that are determined based on at least a feedback signal according to one embodiment of the present invention.
Figure 7B:
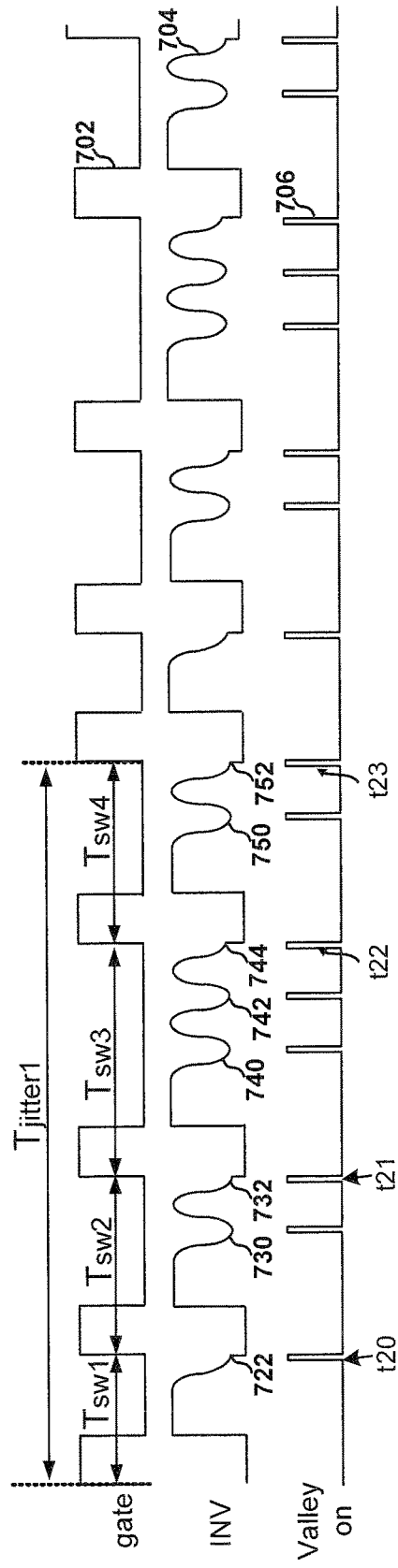
FIG. 7(B) is a simplified timing diagram for a valley-jittering component as part of the system controller as shown in FIG. 6 according to one embodiment of the present invention.
Figure 7C:
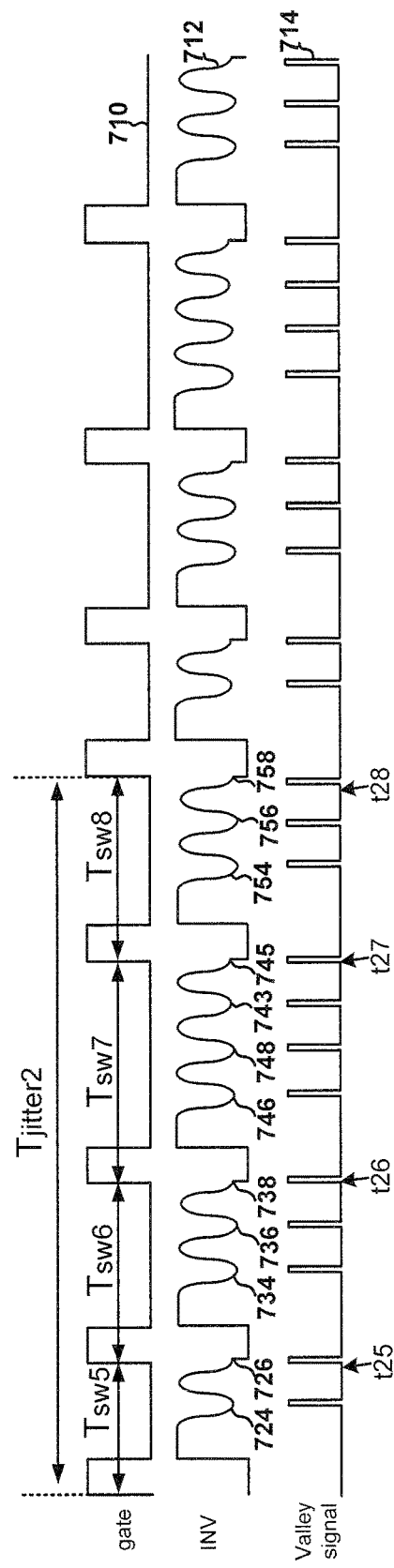
FIG. 7(C) is a simplified timing diagram for a valley-jittering component as part of the system controller as shown in FIG. 6 according to another embodiment of the present invention.

According to some embodiments, the valley-jittering component 680 is configured to generate a signal 685 (e.g., on) to the drive component 681 which operates the power switch 606 in a valley jittering mode (e.g., as shown in FIG. 7(A), FIG. 7(B), and/or FIG. 7(C)). For example, the valley-jittering component 680 is further configured to determine a plurality of valleys (e.g., three consecutive valleys) in the signal 698 during one or more demagnetization periods associated with the demagnetization process. As an example, under heavy output load (e.g., >50% of full output load), the valley-jittering component 680 is configured to close (e.g., turn on) the power switch 606 at one of the plurality of valleys (e.g., periodically) to achieve valley conduction (e.g., as shown in FIG. 7(A), FIG. 7(B), and/or FIG. 7(C)).

Figure 8:
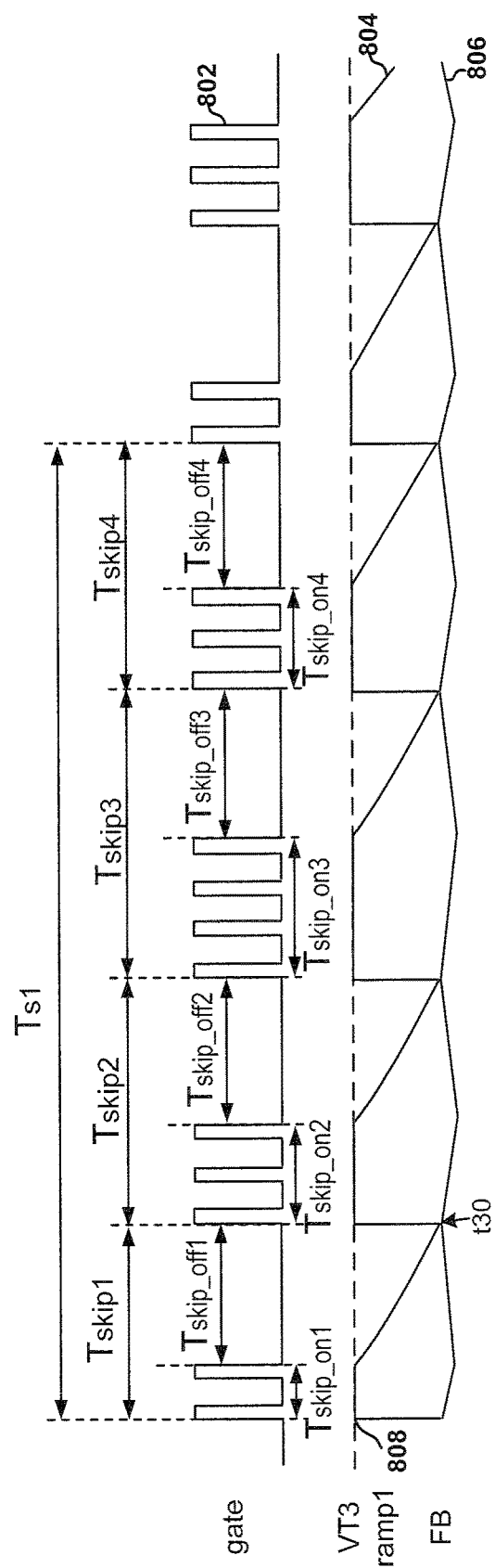
FIG. 8 is a simplified timing diagram for a first frequency-skipping component as part of the system controller as shown in FIG. 6 according to one embodiment of the present invention.
Figure 10:
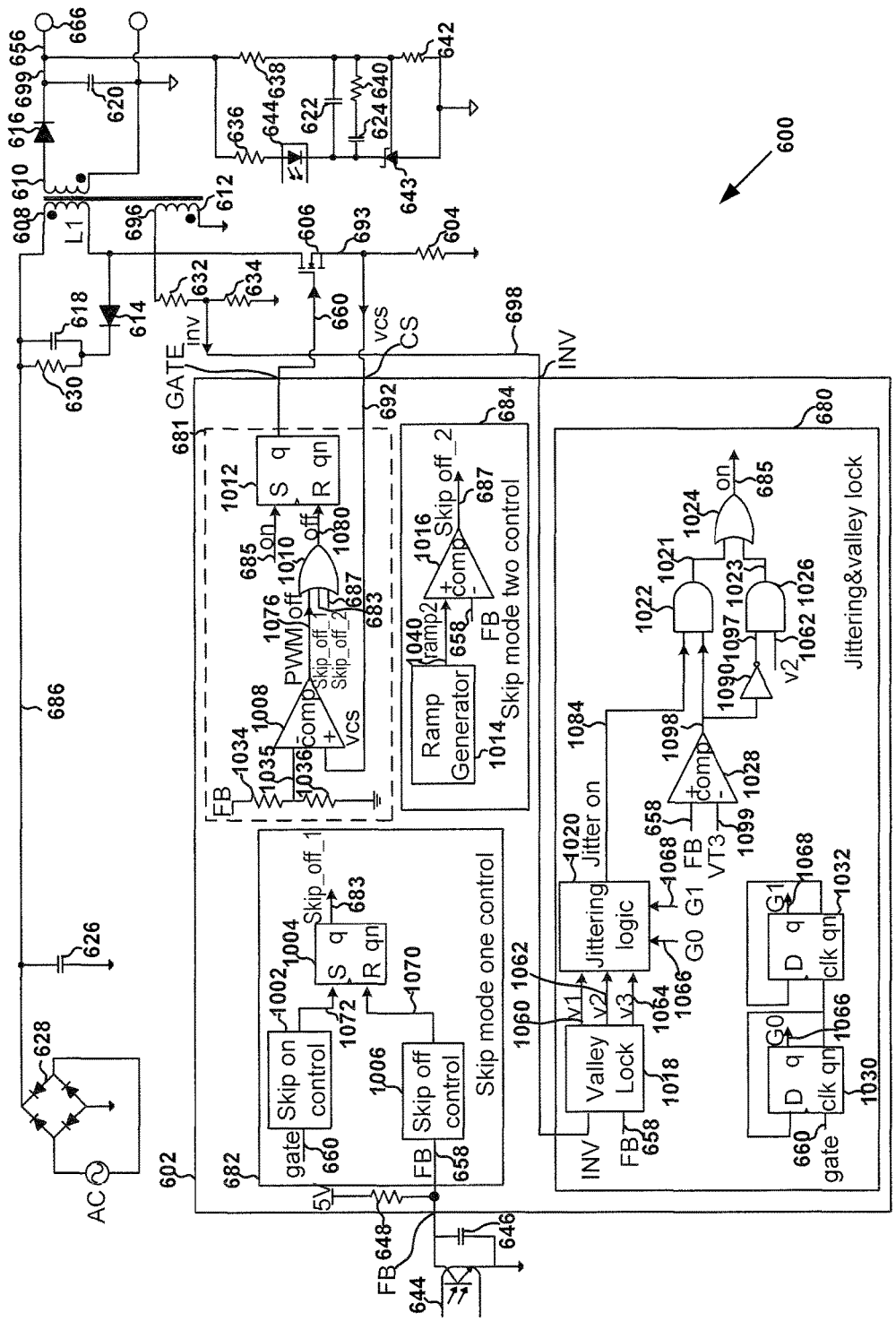
FIG. 10 is a simplified diagram showing the power conversion system as shown in FIG. 6 according to another embodiment of the present invention.

According to certain embodiments, the first frequency-skipping component 682 is configured to generate a signal 683 (e.g., Skip_off_1 as shown in FIG. 10) to the drive component 681 which operates the power switch 606 in a first frequency skipping mode (e.g., as shown in FIG. 8). For example, a first frequency skipping period includes an original skip-on time period and an original skip-off time period. In another example, the original skip-on time period includes a number of on-time periods of the power switch 606, and the switch 606 remains open during the original skip-off time period (e.g., as shown in FIG. 8). As an example, the feedback signal 658 is used to determine the original skip-on time period and the original skip-off time period. As yet another example, the first frequency-skipping component 682 is configured to operate the power switch 606 in the first frequency skipping mode under relatively light output load (e.g., ~25%-50% of full output load).

Figure 9:
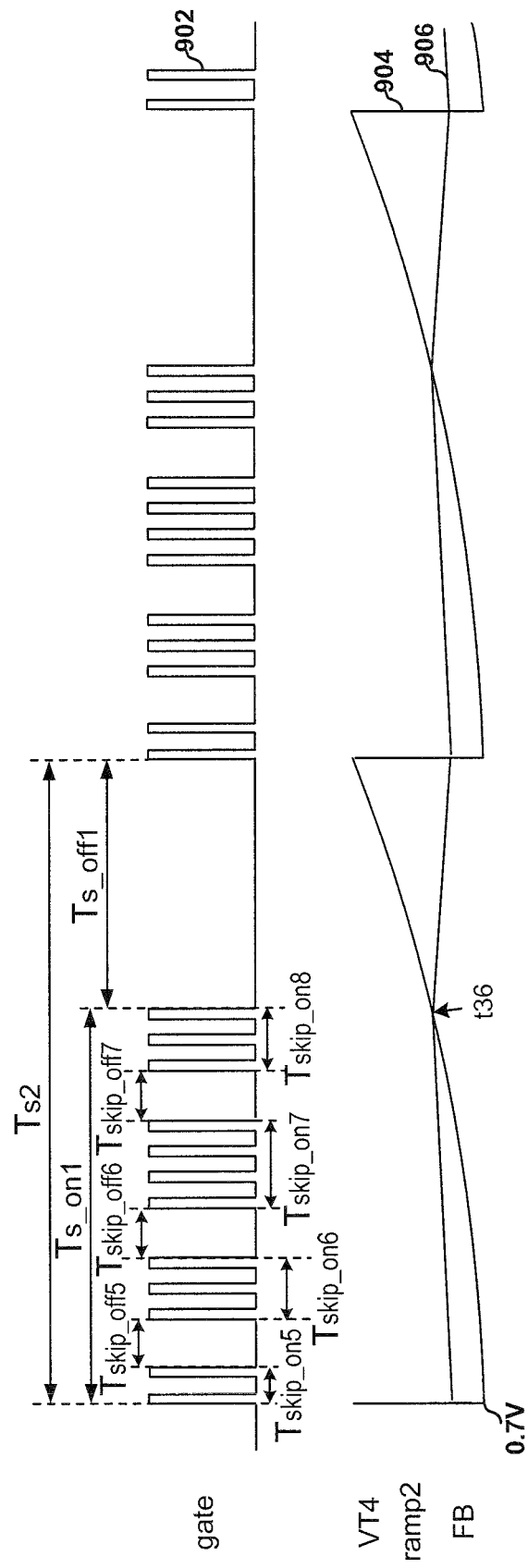
FIG. 9 is a simplified timing diagram for a second frequency-skipping component as part of the system controller as shown in FIG. 6 according to one embodiment of the present invention.

According to some embodiments, the second frequency-skipping component 684 is configured to generate a signal 687 (e.g., Skip_off_2 as shown in FIG. 10) to the drive component 681 which operates the power switch 606 in a second frequency skipping mode (e.g., as shown in FIG. 9). For example, a second frequency skipping period includes a secondary skip-on time period and a secondary skip-off time period. As an example, the secondary skip-on time period corresponds to the first frequency skipping period which includes the original skip-on time period and the original skip-off time period, and during the secondary skip-off time period, the switch 606 remains open (e.g., as shown in FIG. 9). As yet another example, the feedback signal 658 is used to determine the secondary skip-on time period and the secondary skip-off time period. As yet another example, the second frequency-skipping component 684 is configured to operate the power switch 606 in the second frequency skipping mode under very light output load (e.g., ~10% of full output load).

As shown in FIG. 6, the drive component 681 is configured to receive the signals 683, 685, and 687, and generate the drive signal 660 to turn on and off the switch 606 based at least in part on the signals 683, 685, and 687 according to certain embodiments.

FIG. 7(A) is a simplified diagram showing sub-modes of a valley jittering mode that are determined based on at least the feedback signal 658 according to one embodiment of the present invention. This diagram is merely an example, which should not unduly limit the scope of the claims. One of ordinary skill in the art would recognize many variations, alternatives, and modifications.

Two sub-modes of the valley jittering mode are shown in FIG. 7(A), according to some embodiments. For example, a first sub-mode is associated with valley conduction at the second, third, and fourth valleys of the signal 698 (e.g., as shown FIG. 7(C)), and a second sub-mode is associated with valley conduction at the first, second and third valleys of the signal 698 (e.g., as shown in FIG. 7(B)). As an example, if the feedback signal 658 increases in magnitude to be equal to or larger than a threshold voltage VT1 (e.g., 3.0 V), the valley-jittering component 680 in the system controller 602 closes (e.g., turn on) the power switch 606 at the first, second and third valleys of the signal 698 in three consecutive switching periods of the power switch 606 respectively. As another example, if the feedback signal 658 decreases in magnitude to be equal to or smaller than a threshold voltage VT2 (e.g., 2.4 V), the valley-jittering component 680 in the system controller 602 closes (e.g., turn on) the power switch 606 at the second, third and fourth valleys of the signal 698 in three consecutive switching periods of the power switch 606 respectively. As yet another example, if the system controller 602 operates in the valley jittering mode, the first frequency-skipping component 682 keeps the signal 683 at the logic low level and the second frequency-skipping component 684 keeps the signal 687 at the logic low level.

FIG. 7(B) is a simplified timing diagram for the valley-jittering component 680 as part of the system controller 602 according to one embodiment of the present invention. This diagram is merely an example, which should not unduly limit the scope of the claims. One of ordinary skill in the art would recognize many variations, alternatives, and modifications. The waveform 702 represents the drive signal 660 as a function of time, the waveform 704 represents the signal 698 (e.g., INV) as a function of time, and the waveform 706 represents one or more valley-detection signals as a function of time.

According to one embodiment, if the feedback signal 658 increases in magnitude to become equal to or larger than the threshold voltage VT1 (e.g., 3.0 V), the valley-jittering component 680 performs valley conduction jittering using the first, second and third valleys of the signal 698. For example, the valley-jittering component 680 determines an order of valley conduction to be the first valley, the second valley, the third valley, and the second valley for each valley-jittering period. As shown in FIG. 7(B), during a first valley-jittering period, $T_{jitter1}$, the drive signal 660 changes from the logic low level to the logic high level at $t_{20}$, $t_{21}$, $t_{22}$ and $t_{23}$ which correspond to the first valley, the second valley, the third valley, and the second valley in the signal 698 respectively, in some embodiments. For example, a first valley-jittering frequency corresponding to the first valley-jittering period $T_{jitter1}$ is larger than 20 kHz and out of the audible frequency range. If an average switching frequency of the power switch 606 is larger than 80 kHz, the first valley-jittering frequency is larger than 20 kHz, in certain embodiments.

According to another embodiment, the valley 722 is associated with a first demagnetization process during a first switching period (e.g., $T_{sw1}$) of the switch 606, the valleys 730 and 732 are associated with a second demagnetization process during a second switching period (e.g., $T_{sw2}$) of the switch 606, the valleys 740, 742 and 744 are associated with a third demagnetization process during a third switching period (e.g., $T_{sw3}$) of the switch 606, and the valleys 750 and 752 are associated with a fourth demagnetization process during a fourth switching period (e.g., $T_{sw4}$) of the switch 606. For example, the first switching period (e.g., $T_{sw1}$), the second switching period (e.g., $T_{sw2}$), and the third switch period (e.g., $T_{sw3}$) are not equal to each other in duration. In another example, the second switching period (e.g., $T_{sw2}$) and the fourth switching period (e.g., $T_{sw4}$) are equal to each other in duration.

FIG. 7(C) is a simplified timing diagram for the valley-jittering component 680 as part of the system controller 602 according to another embodiment of the present invention. This diagram is merely an example, which should not unduly limit the scope of the claims. One of ordinary skill in the art would recognize many variations, alternatives, and modifications. The waveform 710 represents the drive signal 660 as a function of time, the waveform 712 represents the signal 698 (e.g., INV) as a function of time, and the waveform 714 represents one or more valley-detection signals as a function of time.

According to one embodiment, if the feedback signal 658 decreases in magnitude to become equal to or smaller than the threshold voltage VT2 (e.g., 2.4 V), the valley-jittering component 680 performs valley conduction jittering using the second, third, and fourth valleys of the signal 698. For example, the valley-jittering component 680 determines an order of valley conduction to be the second valley, the third valley, the fourth valley, and the third valley for each valley-jittering period. As shown in FIG. 7(C), during a second valley-jittering period, $T_{jitter2}$, the drive signal 660 changes from the logic low level to the logic high level at $t_{25}$, $t_{26}$, $t_{27}$ and $t_{28}$ which correspond to the second valley, the third valley, the fourth valley, and the third valley in the signal 698 respectively, in some embodiments. For example, a second valley-jittering frequency corresponding to the second valley-jittering period $T_{jitter2}$ is larger than 20 kHz and out of the audible frequency range. If an average switching frequency of the power switch 606 is larger than 80 kHz, the second valley-jittering frequency is larger than 20 kHz, in certain embodiments.

According to another embodiment, the valleys 724 and 726 are associated with a fifth demagnetization process during a fifth switching period (e.g., $T_{sw5}$) of the switch 606, the valleys 734, 736, and 738 are associated with a sixth demagnetization process during a sixth switching period (e.g., $T_{sw6}$) of the switch 606, the valleys 746, 748, 743 and 745 are associated with a seventh demagnetization process during a seventh switching period (e.g., $T_{sw7}$) of the switch 606, and the valleys 754, 756 and 758 are associated with an eighth demagnetization process during an eighth switching period (e.g., $T_{sw8}$) of the switch 606. For example, the fifth switching period (e.g., $T_{sw5}$), the sixth switching period (e.g., $T_{sw6}$), and the seventh switch period (e.g., $T_{sw7}$) are not equal to each other in duration. In another example, the sixth switching period (e.g., $T_{sw6}$) and the eighth switching period (e.g., $T_{sw8}$) are equal to each other in duration.

FIG. 8 is a simplified timing diagram for the first frequency-skipping component 682 as part of the system controller 602 according to one embodiment of the present invention. This diagram is merely an example, which should not unduly limit the scope of the claims. One of ordinary skill in the art would recognize many variations, alternatives, and modifications. The waveform 802 represents the drive signal 660 as a function of time, the waveform 804 represents a ramp signal (e.g., ramp1) as a function of time, and the waveform 806 represents the feedback signal 658 as a function of time.

According to one embodiment, if the feedback signal 658 decreases in magnitude to become equal to or smaller than a threshold voltage VT3 (e.g., 2.1 V), the first frequency-skipping component 682 operates the power switch 606 in the first frequency skipping mode. For example, valley conduction of the power switch 606 is fixed on a particular valley (e.g., the second valley or the third valley) in the signal 698 (e.g., INV). As an example, each original frequency skipping period (e.g., $T_{skip1}$) includes an original skip-on time period (e.g., $T_{skip\_on1}$) and an original skip-off time period (e.g., $T_{skip\_off1}$). In another example, an original skip-on time period (e.g., $T_{skip\_on1}$) includes a number (e.g., one or more) of on-time periods of the power switch 606, and the switch 606 remains open during the original skip-off time period (e.g., $T_{skip\_off1}$).

According to another embodiment, the first frequency-skipping component 682 operates the switch 606 in the first frequency skipping mode in a periodical manner. For example, each overall period (e.g., $T_{s1}$) includes four original frequency skipping periods (e.g., $T_{skip1}$, $T_{skip2}$, $T_{skip3}$, and $T_{skip4}$) which each include an original skip-on time period and an original skip-off time period. As another example, the first frequency-skipping component 682 determines the number of on-time periods of the power switch 606 during each of a plurality of original skip-on time periods within the overall period $T_{s1}$. In another example, four consecutive original skip-on time periods (e.g., $T_{skip\_on1}$, $T_{skip\_on2}$, $T_{skip\_on3}$, and $T_{skip\_on4}$) include two on-time periods of the power switch 606, three on-time periods, four on-time periods, and three on-time periods, respectively. As an example, each of the original skip-off time periods (e.g., $T_{skip\_off1}$, $T_{skip\_off2}$, $T_{skip\_off3}$, and $T_{skip\_off4}$) is of a same duration.

According to yet another embodiment, during an original skip-on time period (e.g., $T_{skip\_on1}$), the ramp signal (e.g., ramp1) keeps at a magnitude 808 (e.g., VT3) as shown by the waveform 804. For example, during the original skip-off time period (e.g., $T_{skip\_off1}$), the ramp signal (e.g., ramp1) decreases in magnitude (e.g., linearly), as shown by the waveform 804. In another example, if the ramp signal (e.g., ramp1) decreases to be equal to or smaller than the feedback signal 658 (e.g., at $t_{30}$) in magnitude, a subsequent original skip-on time period (e.g., $T_{skip\_on2}$) begins.

In yet another example, the smaller the feedback signal 658 in magnitude, the longer the original skip-off time period. For example, if the feedback signal 658 is larger than a threshold voltage VT4 (e.g., 1.6 V) in magnitude, the duration of each corresponding original skip-off time period (e.g., $T_{skip\_off1}$, $T_{skip\_off2}$, $T_{skip\_off3}$, $T_{skip\_off4}$) is shorter than 40 μs, and the corresponding original skipping frequency for the original frequency skipping periods (e.g., $T_{skip1}$, $T_{skip2}$, $T_{skip3}$, $T_{skip4}$) is higher than 20 kHz. In another example, if the feedback signal 658 is equal to a threshold voltage VT4 (e.g., 1.6 V) in magnitude, the duration of each corresponding original skip-off time period (e.g., $T_{skip\_off1}$, $T_{skip\_off2}$, $T_{skip\_off3}$, $T_{skip\_off4}$) is approximately equal to 40 μs, and the corresponding original skipping frequency for the original frequency skipping periods (e.g., $T_{skip1}$, $T_{skip2}$, $T_{skip3}$, $T_{skip4}$) is approximately equal to 20 kHz.

FIG. 9 is a simplified timing diagram for the second frequency-skipping component 684 as part of the system controller 602 according to one embodiment of the present invention. This diagram is merely an example, which should not unduly limit the scope of the claims. One of ordinary skill in the art would recognize many variations, alternatives, and modifications. The waveform 902 represents the drive signal 660 as a function of time, the waveform 904 represents another ramp signal (e.g., ramp2) as a function of time, and the waveform 906 represents the feedback signal 658 as a function of time.

According to one embodiment, if the feedback signal 658 decreases in magnitude to become equal to or smaller than the threshold voltage VT4 (e.g., 1.6 V), the second frequency-skipping component 684 operates the power switch 606 in the second frequency skipping mode. For example, valley conduction of the power switch 606 is fixed on a particular valley (e.g., the second valley or the third valley) in the signal 698 (e.g., INV). As an example, each secondary frequency skipping period (e.g., $T_{s2}$) includes a secondary skip-on time period (e.g., $T_{s\_on1}$) and a secondary skip-off time period (e.g., $T_{s\_off1}$). As another example, the switch 606 remains open during each secondary skip-off time period (e.g., $T_{s\_off1}$). In another example, each secondary skip-on time period (e.g., $T_{s\_on1}$) includes multiple original skip-on time periods (e.g., $T_{skip\_on5}$, $T_{skip\_on6}$, $T_{skip\_on7}$, and $T_{skip\_on8}$) separated by multiple original skip-off time periods (e.g., $T_{skip\_off5}$, $T_{skip\_off6}$, $T_{skip\_off7}$). In yet another example, the first frequency-skipping component 682 determines the number of original skip-on time periods during each of the secondary skip-on time periods (e.g., $T_{s\_on1}$). For example, the secondary skip-on time period $T_{s\_on1}$ includes four original skip-on time periods $T_{skip\_on5}$, $T_{skip\_on6}$, $T_{skip\_on7}$, and $T_{skip\_on8}$ which include two on-time periods of the power switch 606, three on-time periods, four on-time periods, and three on-time periods, respectively. As an example, the original skip-on time periods $T_{skip\_on5}$, $T_{skip\_on6}$, $T_{skip\_on7}$, and $T_{skip\_on8}$ are equal in duration to the original skip-on time periods $T_{skip\_on1}$, $T_{skip\_on2}$, $T_{skip\_on3}$, and $T_{skip\_on4}$ (e.g., as shown in FIG. 8), respectively. As another example, the original skip-off time periods $T_{skip\_off5}$, $T_{skip\_off6}$, and $T_{skip\_off7}$ are equal in duration to the original skip-off time periods $T_{skip\_off1}$, $T_{skip\_off2}$, and $T_{skip\_off3}$ (e.g., as shown in FIG. 8), respectively. As yet another example, the secondary frequency skipping period $T_{s2}$ is followed by another secondary frequency skipping period. As yet another example, the secondary skip-off time period $T_{s\_off1}$ is larger in duration than each of the original skip-off time periods $T_{skip\_off5}$, $T_{skip\_off6}$, and $T_{skip\_off7}$. As yet another example, the duration of the secondary skip-off time period $T_{s\_off1}$ is equal to 40 μs.

According to yet another embodiment, during the secondary frequency skipping period $T_{s2}$, the ramp signal (e.g., ramp2) increases in magnitude (e.g., from VT5 to VT4), as shown by the waveform 902. For example, if the ramp signal (e.g., ramp2) increases in magnitude to become equal to or larger than the feedback signal 658 (e.g., at $t_{36}$), the secondary skip-on time period $T_{s\_on1}$ ends, and the secondary skip-off time period $T_{s\_off1}$ begins. As an example, the ramp signal (e.g., ramp2) has a ramping frequency of 1 kHz. In another example, the smaller the feedback signal 658 in magnitude, the longer the secondary skip-off time period.

FIG. 10 is a simplified diagram showing the power conversion system 600 according to another embodiment of the present invention. This diagram is merely an example, which should not unduly limit the scope of the claims. One of ordinary skill in the art would recognize many variations, alternatives, and modifications. The system controller 602 further includes resistors 1034 and 1036, a comparator 1008, an OR gate 1010, and a flip-flop component 1012. The valley-jittering component 680 includes a valley-lock component 1018, a jittering logic component 1020, two flip-flop components 1030 and 1032, a comparator 1028, a NOT gate 1090, AND gates 1022 and 1026, and an OR gate 1024. The first frequency-skipping component 682 includes a skip-on controller 1002, a skip-off controller 1006, and a flip-flop component 1004. The second frequency-skipping component 684 includes a ramp generator 1014 and a comparator 1016.

According to one embodiment, the valley-lock component 1018 receives the signal 698 (e.g., INV) and the feedback signal 658 and generates three signals 1060 (e.g., V1), 1062 (e.g., V2) and 1064 (e.g., V3) to the jittering logic component 1020. For example, the jittering logic component 1020 receives a signal 1066 (e.g., G0) and a signal 1068 (e.g., G1) which are related to the drive signal 660, and generates one or more jitter control signals 1084 to the AND gate 1022. As an example, the comparator 1028 compares the feedback signal 658 with a threshold voltage 1099 (e.g., VT3) and outputs a comparison signal 1098 to the AND gate 1022 and the NOT gate 1090. As another example, the signal 1062 is output to the AND gate 1026. In another example, the OR gate 1024 outputs the turn-on signal 685 to the flip-flop component 1012 (e.g., at terminal S) which generates the drive signal 660.

Figure 11A:
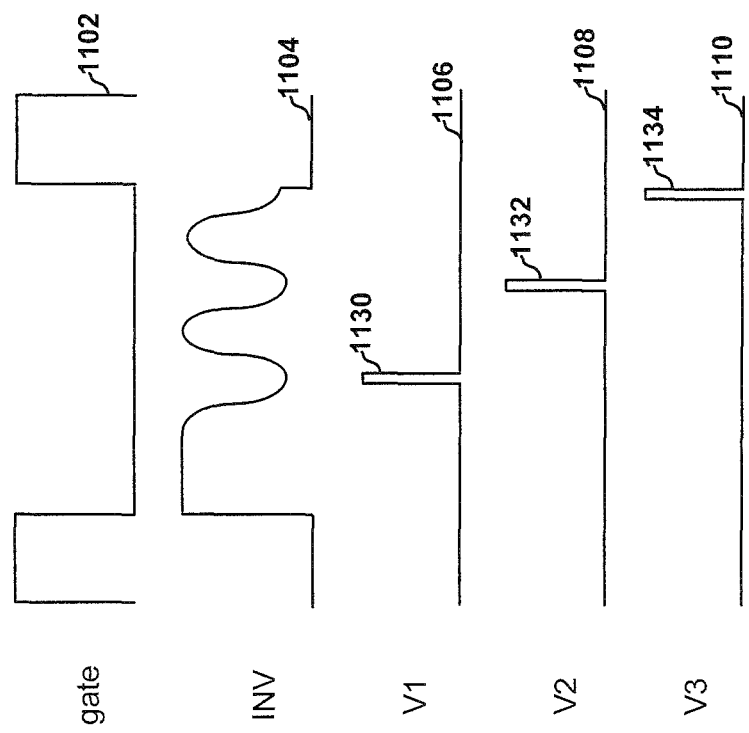
FIG. 11(A) is a simplified timing diagram for a valley-lock component as part of the system controller as shown in FIG. 10 if a feedback signal is larger than a threshold voltage according to one embodiment of the present invention.
Figure 11B:
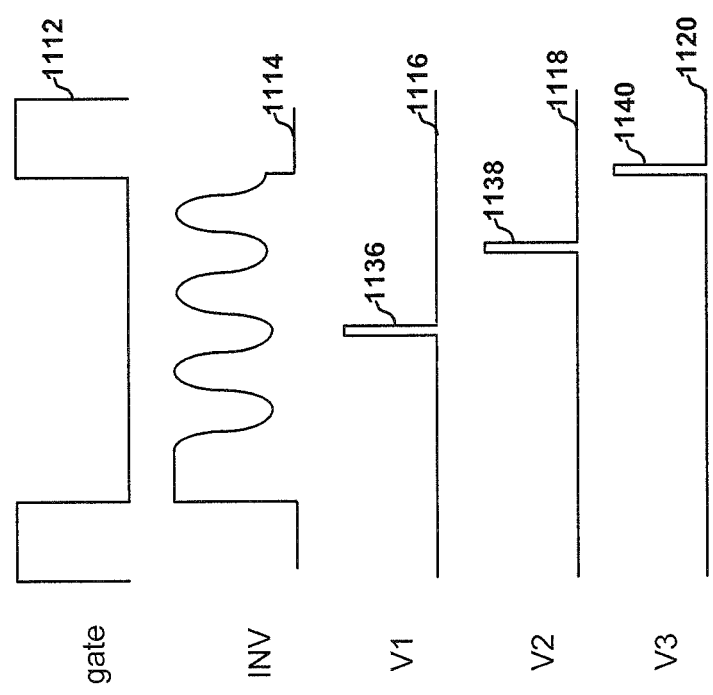
FIG. 11(B) is a simplified timing diagram for a valley-lock component as part of the system controller as shown in FIG. 10 if a feedback signal is smaller than another threshold voltage according to another embodiment of the present invention.

FIG. 11(A) is a simplified timing diagram for the valley-lock component 1018 as part of the system controller 602 as shown in FIG. 10 if the feedback signal 658 is larger than a threshold voltage (e.g., VT1) according to one embodiment of the present invention, and FIG. 11(B) is a simplified timing diagram for the valley-lock component 1018 as part of the system controller 602 as shown in FIG. 10 if the feedback signal 658 is smaller than another threshold voltage (e.g., VT2) according to another embodiment of the present invention. These diagrams are merely examples, which should not unduly limit the scope of the claims. One of ordinary skill in the art would recognize many variations, alternatives, and modifications.

As shown in FIG. 11(A), the waveform 1102 represents the drive signal 660 as a function of time, the waveform 1104 represents the signal 698 (e.g., INV) as a function of time, the waveform 1106 represents the signal 1060 (e.g., V1) as a function of time, the waveform 1108 represents the signal 1062 (e.g., V2) as a function of time, and the waveform 1110 represents the signal 1064 (e.g., V3) as a function of time. As shown in FIG. 11(B), the waveform 1112 represents the drive signal 660 as a function of time, the waveform 1114 represents the signal 698 (e.g., INV) as a function of time, the waveform 1116 represents the signal 1060 (e.g., V1) as a function of time, the waveform 1118 represents the signal 1062 (e.g., V2) as a function of time, and the waveform 1120 represents the signal 1064 (e.g., V3) as a function of time.

According to one embodiment, if the feedback signal 658 is larger than the threshold voltage VT1 (e.g., 3.0 V), the signal 1060 (e.g., V1) includes a pulse 1130 corresponding to a first valley in the signal 698 (e.g., INV), the signal 1062 (e.g., V2) includes a pulse 1132 corresponding to a second valley in the signal 698 (e.g., INV), and the signal 1064 (e.g., V3) includes a pulse 1134 corresponding to a third valley in the signal 698 (e.g., INV), as shown in FIG. 11(A). For example, the drive signal 660 changes from the logic low level to the logic high level at the third valley in the signal 698 (e.g., as shown by the waveform 1102).

According to another embodiment, if the feedback signal 658 is smaller than the threshold voltage VT2 (e.g., 2.4 V), the signal 1060 (e.g., V1) includes a pulse 1136 corresponding to a second valley in the signal 698 (e.g., INV), the signal 1062 (e.g., V2) includes a pulse 1138 corresponding to a third valley in the signal 698 (e.g., INV), and the signal 1064 (e.g., V3) includes a pulse 1140 corresponding to a fourth valley in the signal 698 (e.g., INV), as shown in FIG. 11(B). For example, the drive signal 660 changes from the logic low level to the logic high level at the fourth valley in the signal 698 (e.g., as shown by the waveform 1112).

Figure 12:
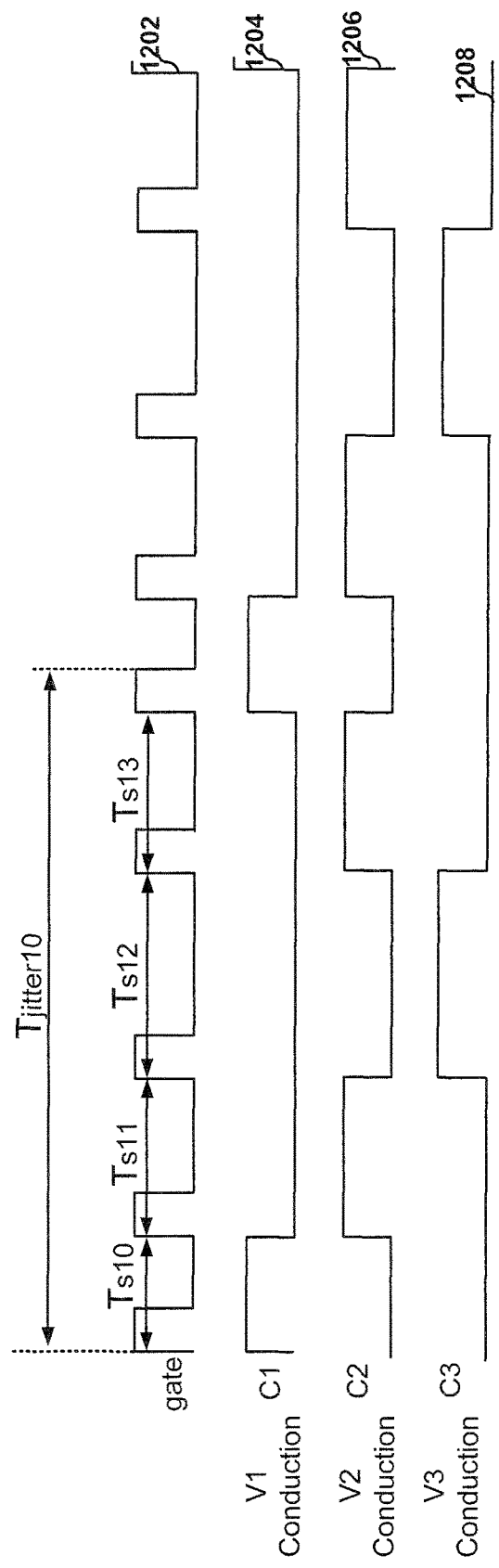
FIG. 12 is a simplified timing diagram for a jittering logic component as part of the system controller as shown in FIG. 10 according to one embodiment of the present invention.

FIG. 12 is a simplified timing diagram for the jittering logic component 1020 as part of the system controller 602 as shown in FIG. 10 according to one embodiment of the present invention. This diagram is merely an example, which should not unduly limit the scope of the claims. One of ordinary skill in the art would recognize many variations, alternatives, and modifications.

The waveform 1202 represents the drive signal 660 as a function of time, the waveform 1204 represents a first jitter control signal (e.g., C1) as a function of time, the waveform 1206 represents a second jitter control signal (e.g., C2) as a function of time, and the waveform 1208 represents a third jitter control signal (e.g., C3) as a function of time. For example, the control signals C1, C2 and C3 are included in the one or more jitter control signals 1084 as shown in FIG. 10. As an example, the control signal C1 corresponds to the signal 1060 (e.g., V1), the control signal C2 corresponds to the signal 1062 (e.g., V2), and the control signal C3 corresponds to the signal 1064 (e.g., V3).

According to one embodiment, the signals C1, C2 and C3 are determined as follows:

$$C1 = \overline{G0} \cdot \overline{G1}$$

$$C2 = G0$$

$$C3 = \overline{G0} \cdot G1 \qquad (1)$$

where G0 represents the signal 1066, and G1 represents the signal 1068.

As shown in FIG. 12, the control signals C1, C2, and C3 determine an order of valley conduction, according to some embodiments. For example, a valley-jittering period (e.g., $T_{jitter10}$) includes four switching periods (e.g., $T_{s10}$, $T_{s11}$, $T_{s12}$, $T_{s13}$). In another example, $T_{jitter10}$ is equal to $T_{jitter1}$ as shown in FIG. 7(B) or $T_{jitter2}$ as shown in FIG. 7(C). As an example, during a first switching period $T_{s10}$ of the switch 606, the control signal C1 is at the logic high level, which indicates that valley conduction occurs at a valley associated with the signal 1060 (e.g., V1). As another example, during a second switching period $T_{s11}$ of the switch 606, the control signal C2 is at the logic high level, which indicates that valley conduction occurs at a valley associated with the signal 1062 (e.g., V2). As yet another example, during a third switching period $T_{s12}$ of the switch 606, the control signal C3 is at the logic high level, which indicates that valley conduction occurs at a valley associated with the signal 1064 (e.g., V3). As yet another example, during a fourth switching period $T_{s13}$ of the switch 606, the control signal C2 is at the logic high level, which indicates that valley conduction occurs at the valley associated with the signal 1062 (e.g., V2). For example, if the feedback signal 658 is larger than the threshold voltage VT1 (e.g., 3.0 V), the order of valley conduction corresponds to the first valley, the second valley, the third valley, and the second valley in the signal 698. In another example, if the feedback signal 658 is smaller than the threshold voltage VT2 (e.g., 2.4 V), the order of valley conduction corresponds to the second valley, the third valley, the fourth valley, and the third valley in the signal 698. The subsequent valley-jittering periods follow a same order of valley conduction as noted above, in certain embodiments.

Referring back to FIG. 10, if the feedback signal 658 is larger than the threshold voltage VT3 (e.g., 2.1 V), the comparator 1028 outputs the comparison signal 1098 at the logic high level, and the valley jittering component 680 operates normally, according to some embodiments. If the feedback signal 658 is smaller than the threshold voltage VT3 (e.g., 2.1 V), the comparator 1028 outputs the comparison signal 1098 at the logic low level, valley conduction is locked at the third valley in the signal 698, and the system 600 enters the first frequency skipping mode, according to certain embodiments. For example, in the first frequency-skipping component 682, the skip-on controller 1002 receives the drive signal 660 and generates a signal 1072 to the flip-flop component 1004 (e.g., at terminal S). For example, the skip-off controller 1006 receives the feedback signal 658 and generates a signal 1070 to the flip-flop component 1004 (e.g., at terminal R) which outputs the first skip-off signal 683 to the OR gate 1010.

According to another embodiment, if the feedback signal 658 decreases in magnitude to become smaller than the threshold voltage VT4 (e.g., 1.6 V), the second frequency-skipping component 684 begins to operate. For example, the ramp generator 1014 generates a ramp signal 1040 (e.g., ramp2) to the comparator 1016 which receives the feedback signal 658 and outputs the comparison signal 687 to the OR gate 1010. In yet another example, a voltage divider including the resistors 1034 and 1036 provides a signal 1035 associated with the feedback signal 658. In yet another example, the comparator 1008 receives the signal 1035 and the current sensing signal 692 and generates another comparison signal 1076 to the OR gate 1010 which outputs a turn-off signal 1080 to the flip-flop component 1012 (e.g., at terminal R).

Figure 13:
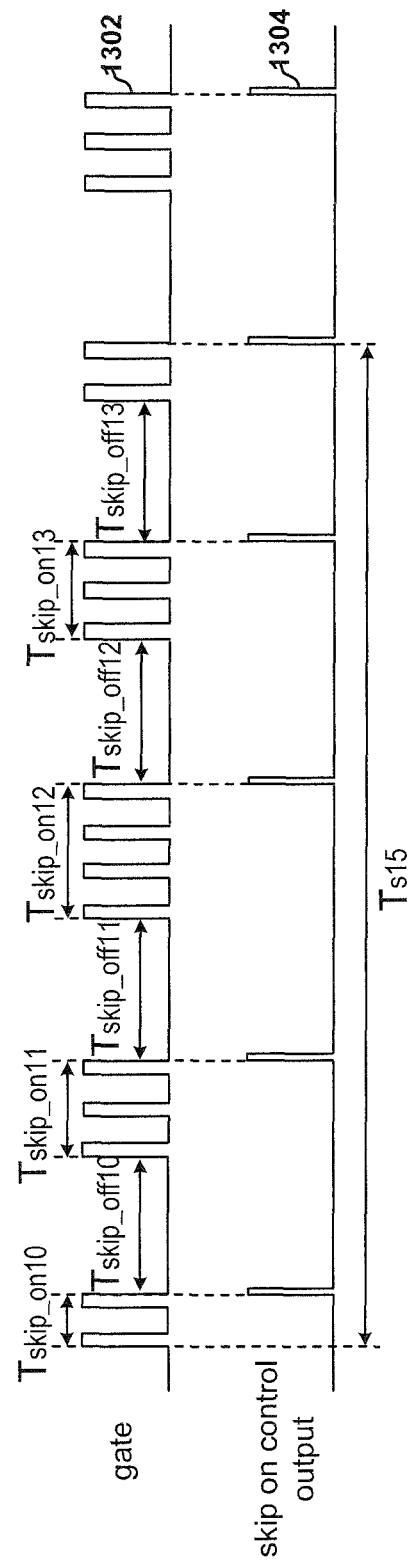
FIG. 13 is a simplified timing diagram for a first frequency-skipping component as part of the system controller as shown in FIG. 10 according to one embodiment of the present invention.

FIG. 13 is a simplified timing diagram for the first frequency-skipping component 682 as part of the system controller 602 as shown in FIG. 10 according to one embodiment of the present invention. This diagram is merely an example, which should not unduly limit the scope of the claims. One of ordinary skill in the art would recognize many variations, alternatives, and modifications. The waveform 1302 represents the drive signal 660 as a function of time, and the waveform 1304 represents the signal 1072 as a function of time.

According to one embodiment, valley conduction of the power switch 606 is fixed on a particular valley (e.g., the second valley or the third valley) in the signal 698 (e.g., INV). As an example, the first frequency-skipping component 682 operates the switch 606 in the first frequency skipping mode in a periodical manner. For example, each overall period (e.g., $T_{s15}$) includes four original frequency skipping periods which each include an original skip-on time period and an original skip-off time period. In another example, the skip-on controller 1002 generates a pulse after each original skip-on time period (e.g., $T_{skip\_on10}$) which indicates the end of the original skip-on time period and the beginning of an original skip-off time period (e.g., $T_{skip\_off10}$). As shown in FIG. 13, four consecutive original skip-on time periods (e.g., $T_{skip\_on10}$, $T_{skip\_on11}$, $T_{skip\_on12}$, and $T_{skip\_on13}$) include two on-time periods of the power switch 606, three on-time periods, four on-time periods, and three on-time periods, respectively. As an example, each of the original skip-off time periods (e.g., $T_{skip\_off10}$, $T_{skip\_off11}$, $T_{skip\_off12}$, and $T_{skip\_off13}$) is of a same duration. As another example, the original skip-on time periods $T_{skip\_on10}$, $T_{skip\_on11}$, $T_{skip\_on12}$, and $T_{skip\_on13}$ are equal in duration to the original skip-on time periods $T_{skip\_on1}$, $T_{skip\_on2}$, $T_{skip\_on3}$, and $T_{skip\_on4}$ (e.g., as shown in FIG. 8), respectively. As yet another example, the original skip-off time periods $T_{skip\_off10}$, $T_{skip\_off11}$, $T_{skip\_off12}$ and $T_{skip\_off13}$ are equal in duration to the original skip-off time periods $T_{skip\_off1}$, $T_{skip\_off2}$, $T_{skip\_off3}$ and $T_{skip\_off4}$ (e.g., as shown in FIG. 8), respectively.

As shown in FIG. 10, if the system controller 602 operates in the first frequency-skipping mode, the second frequency-skipping component 684 keeps the signal 687 at the logic low level, and the valley-jittering component 680 generates the turn-on signal 685 that indicates valley conduction of the power switch 606 is fixed on a particular valley (e.g., the second valley) of the signal 698 (e.g., INV) according to certain embodiments. For example, the valley-jittering component 680 generates a rising edge or a falling edge of the turn-on signal 685 at the particular valley (e.g., the second valley) of the signal 698 (e.g., INV). In another example, the valley-jittering component 680 generates a pulse of the turn-on signal 685 at the particular valley (e.g., the second valley) of the signal 698 (e.g., INV).

According to one embodiment, if the system controller 602 operates in the first frequency-skipping mode, the comparator 1028 generates the comparison signal 1098 at the logic low level (e.g., "0"), and sends the comparison signal 1098 to the AND gate 1022 and the NOT gate 10900. For example, the AND gate 1022 receives the comparison signal 1098 at the logic low level (e.g., "0"), and in response outputs a signal 1021 at the logic low level (e.g., "0") regardless of the one or more jittering control signals 1084 from the jittering logic component 1020. In another example, the NOT gate 1090 also receives the comparison signal 1098 at the logic low level (e.g., "0"), and in response outputs a signal 1097 at the logic high level (e.g., "1") to the AND gate 1026. In yet another example, the AND gate 1026 receives the signal 1097 at the logic high level (e.g., "1") and the signal 1062 (e.g., V2), and in response outputs the signal 1023 that is the same as the signal 1062 (e.g., V2).

As shown in FIG. 10, the OR gate 1024 receives the signal 1023 from the AND gate 1026 and also receives the signal 1021 at the logic low level (e.g., "0") from the AND gate 1022 according to certain embodiments. For example, in response, the OR gate 1024 outputs the turn-on signal 685, which is the same as the signal 1023. In another example, the signal 1023 is the same as the signal 1062 (e.g., V2), and the turn-on signal 685 is also the same as the signal 1062 (e.g., V2). In yet another example, the turn-on signal 685 indicates that valley conduction of the power switch 606 is fixed on a particular valley (e.g., the second valley) in the signal 698 (e.g., INV).

As discussed above and further emphasized here, FIGS. 10 and 13 are merely examples, which should not unduly limit the scope of the claims. One of ordinary skill in the art would recognize many variations, alternatives, and modifications. For example, the AND gate 1062 receives the signal 1060 (e.g., V1) or the signal 1064 (e.g., V3), instead of the signal 1062 (e.g., V2).

Figure 14:
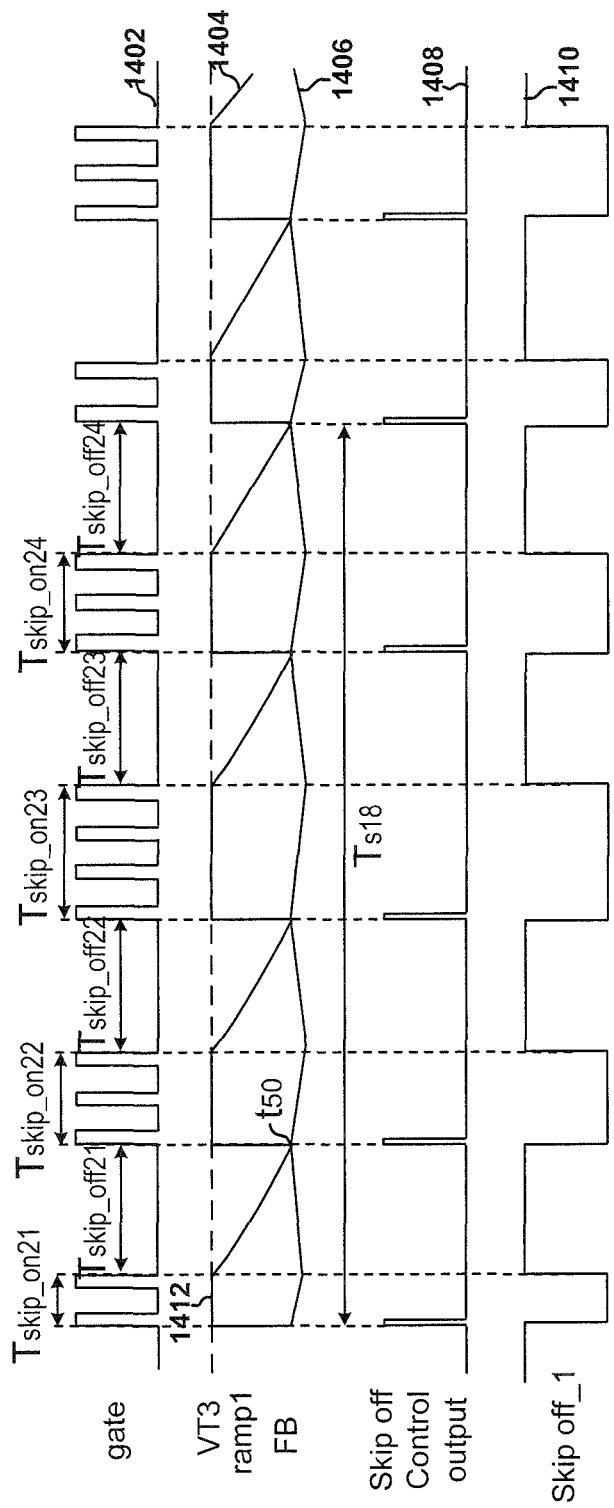
FIG. 14 is a simplified timing diagram for a first frequency-skipping component as part of the system controller as shown in FIG. 10 according to another embodiment of the present invention.

FIG. 14 is a simplified timing diagram for the first frequency-skipping component 682 as part of the system controller 602 as shown in FIG. 10 according to another embodiment of the present invention. This diagram is merely an example, which should not unduly limit the scope of the claims. One of ordinary skill in the art would recognize many variations, alternatives, and modifications. The waveform 1402 represents the drive signal 660 as a function of time, the waveform 1404 represents a ramp signal (e.g., ramp1) as a function of time, the waveform 1406 represents the feedback signal 658 as a function of time, the waveform 1408 represents the signal 1070 as a function of time, and the waveform 1410 represents the signal 683 as a function of time.

According to one embodiment, valley conduction of the power switch 606 is fixed on a particular valley (e.g., the second valley or the third valley) in the signal 698 (e.g., INV). As an example, the first frequency-skipping component 682 operates the switch 606 in the first frequency skipping mode in a periodical manner. For example, each overall period (e.g., $T_{s18}$) includes four original frequency skipping periods which each include an original skip-on time period and an original skip-off time period. As shown in FIG. 14, four consecutive original skip-on time periods (e.g., $T_{skip\_on21}$, $T_{skip\_on22}$, $T_{skip\_on23}$, and $T_{skip\_on24}$) include two on-time periods of the power switch 606, three on-time periods, four on-time periods, and three on-time periods, respectively. As an example, each of the original skip-off time periods (e.g., $T_{skip\_off21}$, $T_{skip\_off22}$, $T_{skip\_off23}$, and $T_{skip\_off24}$) is a function of the feedback signal 658 and the ramp signal (e.g., ramp1).

According to another embodiment, during an original skip-on time period (e.g., $T_{skip\_on21}$), the ramp signal (e.g., ramp1) keeps at a magnitude 1412 (e.g., VT3) as shown by the waveform 1404. For example, during the original skip-off time period (e.g., $T_{skip\_off21}$), the ramp signal (e.g., ramp1) decreases in magnitude (e.g., linearly), as shown by the waveform 1404. For example, if the ramp signal (e.g., ramp1) decreases to smaller than the feedback signal 658 (e.g., at $t_{50}$), the skip-off controller 1006 outputs a pulse in the signal 1070 (e.g., as shown by the waveform 1408), and the flip-flop component 1004 changes the signal 683 from the logic high level to the logic low level. A subsequent original skip-on time period (e.g., $T_{skip\_on22}$) begins. As another example, the original skip-on time periods $T_{skip\_on21}$, $T_{skip\_on22}$, $T_{skip\_on23}$, and $T_{skip\_on24}$ are equal in duration to the original skip-on time periods $T_{skip\_on1}$, $T_{skip\_on2}$, $T_{skip\_on3}$, and $T_{skip\_on4}$ (e.g., as shown in FIG. 8), respectively. As yet another example, the original skip-off time periods $T_{skip\_off21}$, $T_{skip\_off22}$, $T_{skip\_off23}$, and $T_{skip\_off24}$ are equal in duration to the original skip-off time periods $T_{skip\_off1}$, $T_{skip\_off2}$, $T_{skip\_off3}$ and $T_{skip\_off4}$ (e.g., as shown in FIG. 8), respectively. As yet another example, during each original skip-off time period (e.g., $T_{skip\_off21}$), the signal 683 (e.g., Skip_off_1) is at the logic low level. As yet another example, during each original skip-on time period (e.g., $T_{skip\_on22}$), the signal 683 (e.g., Skip_off_1) is at the logic high level.

Figure 15:
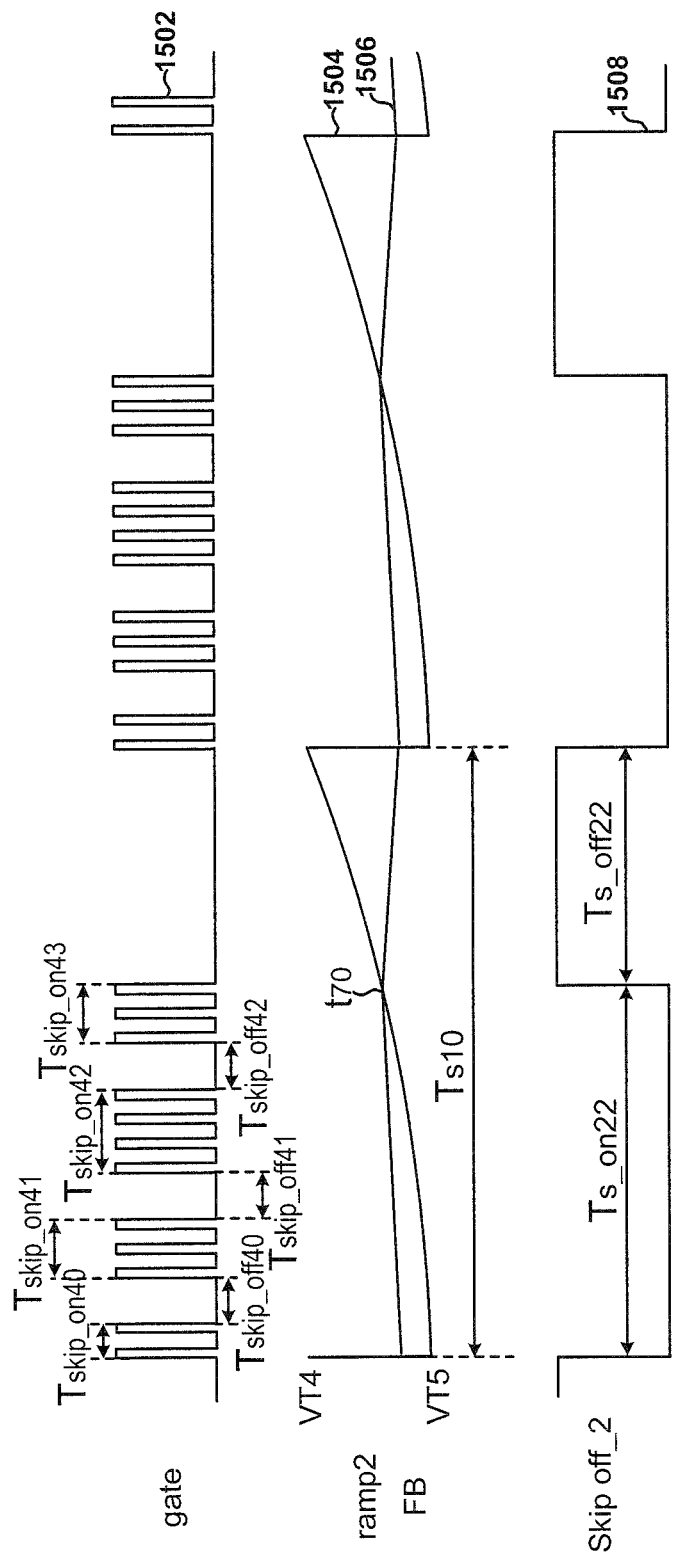
FIG. 15 is a simplified timing diagram for a second frequency-skipping component as part of the system controller as shown in FIG. 10 according to one embodiment of the present invention.

FIG. 15 is a simplified timing diagram for the second frequency-skipping component 684 as part of the system controller 602 as shown in FIG. 10 according to one embodiment of the present invention. This diagram is merely an example, which should not unduly limit the scope of the claims. One of ordinary skill in the art would recognize many variations, alternatives, and modifications. The waveform 1502 represents the drive signal 660 as a function of time, the waveform 1504 represents the ramp signal 1040 (e.g., ramp2) as a function of time, the waveform 1506 represents the feedback signal 658 as a function of time, and the waveform 1508 represents the signal 687 as a function of time.

According to one embodiment, if the feedback signal 658 decreases in magnitude to become smaller than the threshold voltage VT4 (e.g., 1.6 V), the second frequency-skipping component 684 begins to operate, while the first frequency-skipping component 682 continues to operate. For example, valley conduction of the power switch 606 is fixed on a particular valley (e.g., the second valley or the third valley) in the signal 698 (e.g., INV). As an example, each secondary frequency skipping period (e.g., $T_{s10}$) includes a secondary skip-on time period (e.g., $T_{s\_on22}$) and a secondary skip-off time period (e.g., $T_{s\_off22}$). As another example, the switch 606 remains open during each secondary skip-off time period (e.g., $T_{s\_off22}$). In another example, each secondary skip-on time period (e.g., $T_{s\_on22}$) includes multiple original skip-on time periods (e.g., $T_{skip\_on40}$, $T_{skip\_on41}$, $T_{skip\_on42}$, and $T_{skip\_on43}$) separated by multiple original skip-off time periods (e.g., $T_{skip\_off40}$, $T_{skip\_off41}$, $T_{skip\_off42}$). In yet another example, the secondary skip-on time period $T_{s\_on22}$ includes four original skip-on time periods $T_{skip\_on40}$, $T_{skip\_on41}$, $T_{skip\_on42}$, and $T_{skip\_on43}$ which include two on-time periods of the power switch 606, three on-time periods, four on-time periods, and three on-time periods, respectively. As an example, the original skip-on time periods $T_{skip\_on40}$, $T_{skip\_on41}$, $T_{skip\_on42}$, and $T_{skip\_on43}$ are equal in duration to the original skip-on time periods $T_{skip\_on5}$, $T_{skip\_on6}$, $T_{skip\_on7}$, and $T_{skip\_on8}$ (e.g., as shown in FIG. 9), respectively. As another example, the original skip-off time periods $T_{skip\_off40}$, $T_{skip\_off41}$, and $T_{skip\_off42}$ are equal in duration to the original skip-off time periods $T_{skip\_off5}$, $T_{skip\_off6}$, and $T_{skip\_off7}$ (e.g., as shown in FIG. 9), respectively. As yet another example, the secondary frequency skipping period $T_{s10}$ is followed by another secondary frequency skipping period.

According to yet another embodiment, during the secondary frequency skipping period $T_{s10}$, the ramp generator 1014 increases the ramp signal 1040 (e.g., ramp2) in magnitude (e.g., from VT5 to VT4), as shown by the waveform 1504. For example, VT4 is equal to 1.6 V, and VT5 is equal to 0.7 V. In another example, if the ramp signal 1040 (e.g., ramp2) increases to become larger in magnitude than the feedback signal 658 (e.g., at $t_{70}$), the comparator 1016 changes the comparison signal 687 from the logic low level to the logic high level. In another example, the secondary skip-on time period $T_{s\_on22}$ ends, and the secondary skip-off time period $T_{s\_off22}$ begins. As an example, the ramp signal 1040 (e.g., ramp2) has a ramping frequency of about 1 kHz. As another example, during each secondary skip-on time period (e.g., $T_{s\_on22}$), the signal 687 (e.g., Skip_off_2) is at the logic low level. As yet another example, during each secondary skip-off time period (e.g., $T_{s\_off22}$), the signal 687 (e.g., Skip_off_2) is at the logic high level.

As shown in FIG. 10, if the system controller 602 operates in the second frequency-skipping mode, the first frequency-skipping component 684 operates in the same manner as in the first frequency-skipping mode, and the valley-jittering component 680 generates the turn-on signal 685 that indicates valley conduction of the power switch 606 is fixed on a particular valley (e.g., the second valley) of the signal 698 (e.g., INV) according to certain embodiments.

According to one embodiment, if the system controller 602 operates in the second frequency-skipping mode, the comparator 1028 generates the comparison signal 1098 at the logic low level (e.g., "0"), and sends the comparison signal 1098 to the AND gate 1022 and the NOT gate 1090. For example, the AND gate 1022 receives the comparison signal 1098 at the logic low level (e.g., "0"), and in response outputs a signal 1021 at the logic low level (e.g., "0") regardless of the one or more jittering control signals 1084 from the jittering logic component 1020. In another example, the NOT gate 1090 also receives the comparison signal 1098 at the logic low level (e.g., "0"), and in response outputs a signal 1097 at the logic high level (e.g., "1") to the AND gate 1026. In yet another example, the AND gate 1026 receives the signal 1097 at the logic high level (e.g., "1") and the signal 1062 (e.g., V2), and in response outputs the signal 1023 that is the same as the signal 1062 (e.g., V2).

As shown in FIG. 10, the OR gate 1024 receives the signal 1023 from the AND gate 1026 and also receives the signal 1021 at the logic low level (e.g., "0") from the AND gate 1022 according to certain embodiments. For example, in response, the OR gate 1024 outputs the turn-on signal 685, which is the same as the signal 1023. In another example, the signal 1023 is the same as the signal 1062 (e.g., V2), and the turn-on signal 685 is also the same as the signal 1062 (e.g., V2). In yet another example, the turn-on signal 685 indicates that valley conduction of the power switch 606 is fixed on a particular valley (e.g., the second valley) in the signal 698 (e.g., INV).

As discussed above and further emphasized here, FIGS. 10 and 14 are merely examples, which should not unduly limit the scope of the claims. One of ordinary skill in the art would recognize many variations, alternatives, and modifications. For example, the AND gate 1062 receives the signal 1060 (e.g., V1) or the signal 1064 (e.g., V3), instead of the signal 1062 (e.g., V2).

According to certain embodiments, the system controller 602 operates in the valley-jittering mode, the first frequency-skipping mode, or the second frequency-skipping mode, based on the output load (e.g., the output current 699) which is associated with the feedback signal 658. For example, the valley-jittering component 680, the first frequency-skipping component 684 and the second frequency-skipping component 684 operate in different manners based on the feedback signal 658.

In one embodiment, if the feedback signal 658 is equal to or larger than the threshold voltage VT3 (e.g., 2.1 V), the system controller 602 operates in the valley-jittering mode. For example, in the valley-jittering mode, the valley-jittering component 680 performs valley conduction jittering at a number of valleys of the signal 698 (e.g., INV) periodically (e.g., as shown in FIG. 7(A), FIG. 7(B), and/or FIG. 7(C)). In another example, in the valley-jittering mode, the first frequency-skipping component 682 keeps the output signal 683 (e.g., Skip_off_1) at the logic low level, and the second frequency-skipping component 684 keeps the output signal 687 (e.g., Skip_off_2) at the logic low level.

In another embodiment, if the feedback signal 658 is within a range between the threshold voltage VT3 (e.g., 2.1 V) and the threshold voltage VT4 (e.g., 1.6 V), the system controller 602 operates in the first frequency-skipping mode. For example, in the first frequency-skipping mode, the first frequency-skipping component 684 changes the signal 683 (e.g., Skip_off_1) between the logic low level and the logic high level (e.g., as shown by the waveform 1410 of FIG. 14). In yet another example, in the first frequency-skipping mode, the valley-jittering component 680 performs valley conduction at a fixed valley (e.g., the second valley) of the signal 698 (e.g., INV) periodically. In yet another example, in the first frequency-skipping mode, the second frequency-skipping component 684 keeps the output signal 687 (e.g., Skip_off_2) at the logic low level.

In yet another embodiment, if the feedback signal 658 is equal to or smaller than the threshold voltage VT4 (e.g., 1.6 V), the system controller 602 operates in the second frequency-skipping mode. For example, in the second frequency-skipping mode, the second frequency-skipping component 684 changes the signal 687 (e.g., Skip_off_2) between the logic low level and the logic high level (e.g., as shown by the waveform 1508 of FIG. 15). In another example, in the second frequency-skipping mode, the first frequency-skipping component 684 operates in the same manner as in the first frequency-skipping mode, and changes the signal 683 (e.g., Skip_off_1) between the logic low level and the logic high level (e.g., as shown by the waveform 1410 of FIG. 14). In yet another example, in the second frequency-skipping mode, the valley-jittering component 680 operates in the same manner as in the first frequency-skipping mode, and performs valley conduction at a fixed valley (e.g., the second valley) of the signal 698 (e.g., INV) periodically.

According to one embodiment, a system controller for regulating a power conversion system includes: a first signal processing component (e.g., the valley jittering component 680) configured to receive a first signal (e.g., the signal 698) associated with an auxiliary winding of a power conversion system and generate a second signal (e.g., the signal 685) based at least in part on the first signal, the power conversion system further including a primary winding and a secondary winding; and a drive component (e.g., the drive component 681) configured to receive the second signal and output a drive signal to open or close a switch to affect a current flowing through the primary winding. The first signal processing component is further configured to: detect a plurality of valleys of the first signal, the plurality of valleys corresponding to a same demagnetization process of the power conversion system; select a valley from the plurality of valleys; and change the second signal at the selected valley. The drive component is further configured to change the drive signal based on at least information associated with the selected valley in order to close the switch. For example, the system controller is implemented according to at least FIG. 6, FIG. 7(A), FIG. 7(B), FIG. 7(C), FIG. 10, FIG. 11(A), FIG. 11(B), and/or FIG. 12.

For example, the first signal processing component is further configured to receive a third signal (e.g., the feedback signal 658) associated with an output signal of the power conversion system and select the valley from the plurality of valleys based at least in part on the first signal and the third signal. In another example, the first signal processing component is further configured to: in response to the third signal increasing to become larger than a first threshold (e.g., VT2 as shown in FIG. 7(A)) but remain smaller than a second threshold (e.g., VT1 as shown in FIG. 7(A)) in magnitude, detect the plurality of valleys to include a second valley in time, a third valley in time, and a fourth valley in time (e.g., as shown in FIG. 7(C)), all of the second valley, the third valley, and the fourth valley corresponding to the same demagnetization process, the first threshold being smaller than the second threshold in magnitude; in response to the third signal increasing to become larger than the second threshold in magnitude, detect the plurality of valleys to include a first valley in time, the second valley in time, and the third valley in time (e.g., as shown in FIG. 7(B)), all of the first valley, the second valley, and the third valley corresponding to the same demagnetization process; in response to the third signal decreasing to become smaller than the second threshold but remain larger than the first threshold in magnitude, detect the plurality of valleys to include the first valley in time, the second valley in time, and the third valley in time, all of the first valley, the second valley, and the third valley corresponding to the same demagnetization process; and in response to the third signal decreasing to become smaller than the first threshold in magnitude, detect the plurality of valleys to include the second valley in time, the third valley in time, and the fourth valley in time, all of the second valley, the third valley, and the fourth valley corresponding to the same demagnetization process.

According to another embodiment, a system controller for regulating a power conversion system includes: a first signal processing component (e.g., the valley jittering component 680) configured to receive a first signal (e.g., the signal 698)

associated with an auxiliary winding of a power conversion system and generate a second signal (e.g., the signal 685) based at least in part on the first signal, the power conversion system further including a primary winding and a secondary winding; a second signal processing component (e.g., the first frequency-skipping component 682) configured to receive a third signal (e.g., the feedback signal 658) associated with an output signal of the power conversion system and generate a fourth signal (e.g., the signal 683) based at least in part on the third signal, the fourth signal indicating a first time period (e.g., the original skip-off time period $T_{skip\_off1}$); and a drive component (e.g., the drive component 681) configured to receive the second signal and the fourth signal and output a drive signal to open or close a switch to affect a current flowing through the primary winding. The first signal processing component is further configured to: determine a first group of one or more valleys of the first signal, the first group of one or more valleys corresponding to a first group of one or more demagnetization periods of the power conversion system respectively; and change the second signal at each valley of the first group of one or more valleys. The drive component is further configured to: keep the drive signal unchanged during the first time period indicated by the fourth signal in order to keep the switch open; and change the drive signal based on at least information associated with the first group of one or more valleys outside the first time period in order to close the switch. For example, the system controller is implemented according to at least FIG. 6, FIG. 8, FIG. 10, FIG. 13, and/or FIG. 14. For example, the drive component is further configured to change the drive signal periodically at a drive frequency corresponding to a drive time period (e.g., the overall period $T_{s1}$ as shown in FIG. 8); and the drive time period includes the first time period and the first group of one or more demagnetization periods.

According to yet another embodiment, a system controller for regulating a power conversion system includes: a first signal processing component (e.g., the valley jittering component 680) configured to receive a first signal (e.g., the signal 698) associated with an auxiliary winding of a power conversion system and generate a second signal (e.g., the signal 685) based at least in part on the first signal; a second signal processing component (e.g., the first frequency-skipping component 682) configured to receive a third signal (e.g., the feedback signal 658) and generate a fourth signal (e.g., the signal 683) based at least in part on the third signal, the third signal being associated with an output signal of the power conversion system, the fourth signal indicating a plurality of time periods (e.g., the original skip-off periods, $T_{skip\_off1}$, $T_{skip\_off2}$, etc.); a third signal processing component (e.g., the second frequency-skipping component 684) configured to receive the third signal and generate a fifth signal (e.g., the signal 687) based at least in part on the third signal, the fifth signal indicating an off time period (e.g., the secondary skip-off time period $T_{s\_off1}$), the off time period not overlapping with the plurality of time periods; and a drive component (e.g., the drive component 681) configured to receive the second signal, the fourth signal and the fifth signal and to output a drive signal (e.g., the drive signal 660) to open or close a switch to affect a current flowing through the primary winding. The first signal processing component is further configured to: determine a first group of one or more valleys of the first signal, the first group of one or more valleys corresponding to a first group of one or more demagnetization periods of the power conversion system respectively; and change the second signal at each valley of the group of one or more valleys. The drive component is further configured to: keep the drive signal unchanged during the plurality of time periods indicated by the fourth signal in order to keep the switch open; keep the drive signal unchanged during the off time period indicated by the fifth signal in order to keep the switch open; and change the drive signal based on at least information associated with the first group of one or more valleys outside the plurality of time periods and outside the off time period in order to close the switch. For example, the system controller is implemented according to at least FIG. 6, FIG. 9, FIG. 10, and/or FIG. 15. In another example, the drive component is further configured to change the drive signal periodically at a drive frequency corresponding to a drive time period (e.g., the secondary frequency skipping period $T_{s2}$ as shown in FIG. 9); and the drive time period includes the plurality of time periods and the off time period.

In one embodiment, a method for regulating a power conversion system includes: receiving a first signal; generating a second signal based at least in part on the first signal; receiving the second signal; and outputting a drive signal based at least in part on the second signal. The generating the second signal based at least in part on the first signal includes: detecting a plurality of valleys of the first signal, the plurality of valleys corresponding to a same demagnetization process; selecting a valley from the plurality of valleys; and changing the second signal at the selected valley. The outputting the drive signal based at least in part on the second signal includes changing the drive signal based on at least information associated with the selected valley. For example, the method is implemented according to at least FIG. 6, FIG. 7(A), FIG. 7(B), FIG. 7(C), FIG. 10, FIG. 11(A), FIG. 11(B), and/or FIG. 12.

In another embodiment, a method for regulating a power conversion system includes: receiving a first signal; generating a second signal based at least in part on the first signal; receiving a third signal; generating a fourth signal based at least in part on the third signal, the fourth signal indicating a first time period; receiving the second signal and the fourth signal; and outputting a drive signal based at least in part on the second signal and the fourth signal. The generating the second signal based at least in part on the first signal includes: determining a first group of one or more valleys of the first signal, the first group of one or more valleys corresponding to a first group of one or more demagnetization periods respectively; and changing the second signal at each valley of the first group of one or more valleys. The outputting the drive signal based at least in part on the second signal and the fourth signal includes: keeping the drive signal unchanged during the first time period indicated by the fourth signal; and changing the drive signal based on at least information associated with the first group of one or more valleys outside the first time period. For example, the method is implemented according to at least FIG. 6, FIG. 8, FIG. 10, FIG. 13, and/or FIG. 14.

In yet another embodiment, a method for regulating a power conversion system includes: receiving a first signal; generating a second signal based at least in part on the first signal; receiving a third signal; generating a fourth signal based at least in part on the third signal, the fourth signal indicating a plurality of time periods; generating a fifth signal based at least in part on the third signal, the fifth signal indicating an off time period, the off time period not overlapping with the plurality of time periods; receiving the second signal, the fourth signal, and the fifth signal; and outputting a drive signal based at least in part on the second signal, the fourth signal and the fifth signal. The generating the second signal based at least in part on the first signal includes: determining a first group of one or more valleys of the first signal, the first group of one or more valleys corresponding to a first group of one or more demagnetization periods respectively; and changing the second signal at each valley of the group of one or more valleys. The outputting the drive signal based at least in part on the second signal includes: keeping the drive signal unchanged during the plurality of time periods indicated by the fourth signal; keeping the drive signal unchanged during the off time period indicated by the fifth signal; and changing the drive signal based on at least information associated with the first group of one or more valleys outside the plurality of time periods and outside the off time period. For example, the method is implemented according to at least FIG. 6, FIG. 9, FIG. 10, and/or FIG. 15.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for a power converter, the system controller comprising:
   a first signal generator configured to receive a first signal associated with an auxiliary winding of a power converter and output a drive signal to a switch to affect a current flowing through a primary winding of the power converter;
   wherein the first signal generator is further configured to:
      detect a plurality of valleys of the first signal, the plurality of valleys corresponding to a same demagnetization process of the power converter;
      select a valley from the plurality of valleys;
      change a second signal at a time corresponding to the selected valley; and
      change the drive signal based at least in part on the selected valley in order to close the switch.

2. The system controller of claim 1 wherein the plurality of valleys include multiple consecutive valleys corresponding to the same demagnetization process.

3. The system controller of claim 1 wherein the first signal generator is further configured to, at the time corresponding to the selected valley, change the second signal from a first logic level to a second logic level.

4. The system controller of claim 3 wherein the first logic level corresponds to a logic low level and the second logic level corresponds to a logic high level.

5. The system controller of claim 3 wherein the first logic level corresponds to a logic high level and the second logic level corresponds to a logic low level.

6. The system controller of claim 1 wherein the first signal generator is further configured to receive a third signal associated with an output signal of the power converter and select the valley from the plurality of valleys based at least in part on the first signal and the third signal.

7. The system controller of claim 6 wherein the first signal generator is further configured to:
   in response to the third signal increasing to become larger than a first threshold but remain smaller than a second threshold in magnitude, detect the plurality of valleys to include a second valley in time, a third valley in time, and a fourth valley in time, all of the second valley, the third valley, and the fourth valley corresponding to the same demagnetization process, the first threshold being smaller than the second threshold in magnitude;
   in response to the third signal increasing to become larger than the second threshold in magnitude, detect the plurality of valleys to include a first valley in time, the second valley in time, and the third valley in time, all of the first valley, the second valley, and the third valley corresponding to the same demagnetization process;
   in response to the third signal decreasing to become smaller than the second threshold but remain larger than the first threshold in magnitude, detect the plurality of valleys to include the first valley in time, the second valley in time, and the third valley in time, all of the first valley, the second valley, and the third valley corresponding to the same demagnetization process; and
   in response to the third signal decreasing to become smaller than the first threshold in magnitude, detect the plurality of valleys to include the second valley in time, the third valley in time, and the fourth valley in time, all of the second valley, the third valley, and the fourth valley corresponding to the same demagnetization process.

8. The system controller of claim 1 wherein the first signal generator includes:
   a valley-lock signal generator configured to receive the first signal and a third signal associated with an output signal of the power converter and generate one or more fourth signals associated with the selected valley from the plurality of valleys;
   a jitter-on signal generator configured to receive the one or more fourth signals and generate a fifth signal based at least in part on the one or more fourth signals; and
   a second signal generator configured to receive the fifth signal and output the second signal based at least in part on the fifth signal.

9. The system controller of claim 8 wherein the first signal generator further includes one or more flip-flops configured to receive the drive signal and output one or more sixth signals to the jitter-on signal generator.

10. The system controller of claim 8 wherein the first signal generator further includes a comparator configured to receive the third signal and a threshold signal and output a comparison signal to the second signal generator.

11. The system controller of claim 10 wherein the second signal generator includes:
   a first AND gate configured to receive the fifth signal and the comparison signal and output a sixth signal;
   a second AND gate configured to receive a seventh signal complementary to the comparison signal, receive one signal of the one or more fourth signals, and output an eighth signal; and
   an OR gate configured to receive the sixth signal and the eighth signal and output the second signal.

12. The system controller of claim 1, further comprising:
a second signal generator configured to receive a third signal associated with an output signal of the power converter and output a fourth signal to the first signal generator, the fourth signal indicating a first time period;
wherein the first signal generator is further configured to:
   determine one or more valleys of the first signal, the one or more valleys corresponding to one or more demagnetization periods of the power converter respectively;
   change the second signal at one or more times corresponding to each valley of the one or more valleys respectively;
   receive the fourth signal;
   keep the drive signal unchanged during the first time period indicated by the fourth signal in order to keep the switch open; and
   change the drive signal based at least in part on the one or more valleys during a second time period in order to close the switch, the second time period not overlapping with the first time period.

13. The system controller of claim 12 wherein the first signal generator includes:
a comparator configured to receive a fifth signal related to the third signal and a sixth signal related to the current and output a comparison signal based at least in part on the fifth signal and the sixth signal; and
an OR gate configured to receive the comparison signal and the fourth signal and output a seventh signal based at least in part on the comparison signal and the fourth signal.

14. The system controller of claim 13 wherein the first signal generator further includes a flip-flop configured to receive the second signal and the seventh signal and output the drive signal based at least in part on the second signal and the seventh signal.

15. The system controller of claim 12, further comprising:
a third signal generator configured to receive the third signal and generate a fifth signal to the first signal generator, the fifth signal indicating a third time period, the third time period not overlapping with the first time period;
wherein the first signal generator is further configured to:
   keep the drive signal unchanged during the third time period indicated by the fifth signal in order to keep the switch open; and
   change the drive signal based at least in part on the one or more valleys during a fourth time period in order to close the switch, the fourth time period not overlapping with the first time period and the third time period.

16. A system controller for a power converter, the system controller comprising:
a first signal generator configured to receive a first signal associated with an auxiliary winding of a power converter and change a second signal; and
a second signal generator configured to receive a third signal associated with an output signal of the power converter and generate a fourth signal based at least in part on the third signal, the fourth signal indicating a first time period;
wherein the first signal generator is further configured to:
   output a drive signal to a switch to affect a current flowing through a primary winding of the power converter;
   determine one or more first valleys of the first signal, the one or more first valleys corresponding to one or more first demagnetization periods of the power converter respectively;
   change the second signal at one or more times corresponding to each valley of one or more first valleys;
   keep the drive signal unchanged during the first time period indicated by the fourth signal in order to keep the switch open; and
   change the drive signal based at least in part on the one or more first valleys during a second time period in order to close the switch, the second time period not overlapping with the first time period.

17. The system controller of claim 16 wherein the second signal generator is further configured to receive the drive signal and generate the fourth signal based at least in part on the third signal and the drive signal.

18. The system controller of claim 16 wherein:
the one or more first valleys include multiple valleys;
the one or more first demagnetization periods include multiple demagnetization periods; and
different valleys of the one or more first valleys correspond to different demagnetization periods of the one or more first demagnetization periods respectively.

19. The system controller of claim 16 wherein:
the one or more first valleys include only one valley; and
the one or more first demagnetization periods include only one demagnetization period.

20. The system controller of claim 16 wherein:
the first signal generator is further configured to change the drive signal periodically at a frequency corresponding to a third time period; and
the third time period includes the first time period and the one or more first demagnetization periods.

21. The system controller of claim 16 wherein:
the second signal generator is further configured to output the fourth signal to indicate a third time period, the third time period not overlapping with the first time period;
the first signal generator is further configured to:
   determine one or more second valleys of the first signal, the one or more second valleys corresponding to one or more second demagnetization periods of the power converter respectively, the one or more second valleys not overlapping with the one or more first valleys, the one or more second demagnetization periods not overlapping with the one or more first demagnetization periods;
   change the second signal at one or more times corresponding to each valley of the one or more second valleys;
   keep the drive signal unchanged during the third time period indicated by the fourth signal in order to keep the switch open; and
   change the drive signal based at least in part on the one or more first valleys and the one or more second valleys during a fourth time period in order to close the switch, the fourth time period not overlapping with the first time period and the third time period.

22. The system controller of claim 21 wherein:
the first signal generator is further configured to change the drive signal periodically at a frequency corresponding to a fifth time period; and
the fifth time period includes the one or more first demagnetization periods, the first time period, the one or more second demagnetization periods, and the third time period.

23. The system controller of claim 21 wherein the first time period and the third time period are equal in duration.

24. The system controller of claim 21 wherein:
the one or more second valleys include multiple valleys;
the one or more second demagnetization periods include multiple demagnetization periods; and
different valleys of the one or more second valleys correspond to different demagnetization periods of the one or more second demagnetization periods respectively.

25. The system controller of claim 21 wherein:
the one or more second valleys include only one valley; and
the one or more second demagnetization periods include only one demagnetization period.

26. The system controller of claim 21 wherein:
the second signal generator is further configured to generate the fourth signal to indicate a fifth time period, the fifth time period not overlapping with the first time period and the third time period; and
the first signal generator is further configured to:
determine one or more third valleys of the first signal, the one or more third valleys corresponding to one or more third demagnetization periods of the power converter respectively, the one or more third valleys not overlapping with the one or more first valleys and the one or more second valleys, the one or more third demagnetization periods not overlapping with the one or more first demagnetization periods and the one or more second demagnetization periods;
change the second signal at one or more times corresponding to each valley of the one or more third valleys;
keep the drive signal unchanged during the fifth time period indicated by the fourth signal in order to keep the switch open; and
change the drive signal based at least in part on the one or more first valleys, the one or more second valleys and the one or more third valleys during a sixth time period in order to close the switch, the sixth time period not overlapping with the first time period, the third time period and the fifth time period.

27. The system controller of claim 16, further comprising:
a third signal generator configured to receive the third signal and output a fifth signal to the first signal generator, the fifth signal indicating a third time period, the third time period not overlapping with the first time period;
wherein the first signal generator is further configured to:
keep the drive signal unchanged during the third time period indicated by the fifth signal in order to keep the switch open; and
change the drive signal based at least in part on the one or more first valleys during a fourth time period in order to close the switch, the fourth time period not overlapping with the first time period and the third time period.

28. The system controller of claim 16 wherein the second signal generator includes:
a third signal generator configured to receive the drive signal and output a fifth signal indicating a beginning of the first time period based at least in part on the drive signal;
a fourth signal generator configured to receive the third signal and output a sixth signal indicating an end of the first time period based at least in part on the third signal; and
a first flip-flop configured to receive the fifth signal and the sixth signal and output the fourth signal based at least in part on the fifth signal and the sixth signal.

29. The system controller of claim 28 wherein the first signal generator includes:
a comparator configured to receive a seventh signal related to the third signal and an eighth signal related to the current and output a comparison signal based at least in part on the seventh signal and the eighth signal; and
an OR gate configured to receive the comparison signal and the fourth signal and output a ninth signal based at least in part on the comparison signal and the fourth signal.

30. The system controller of claim 29 wherein the first signal generator further includes a second flip-flop configured to receive the second signal and the ninth signal and output the drive signal based at least in part on the second signal and the ninth signal.

31. A system controller for a power converter, the system controller comprising:
a first signal generator configured to receive a first signal associated with an auxiliary winding of a power converter and change a second signal;
a second signal generator configured to receive a third signal and generate a fourth signal based at least in part on the third signal, the third signal being associated with an output signal of the power converter, the fourth signal indicating a plurality of first time periods; and
a third signal generator configured to receive the third signal and generate a fifth signal based at least in part on the third signal, the fifth signal indicating a second time period, the second time period not overlapping with the first time periods;
wherein the first signal generator is further configured to:
receive the fourth signal and the fifth signal;
output a drive signal to a switch to affect a current flowing through a primary winding of the power converter;
determine one or more valleys of the first signal, the one or more valleys corresponding to one or more demagnetization periods of the power converter respectively;
change the second signal at one or more times corresponding to each valley of the one or more valleys;
keep the drive signal unchanged during the first time periods indicated by the fourth signal in order to keep the switch open;
keep the drive signal unchanged during the second time period indicated by the fifth signal in order to keep the switch open; and
change the drive signal based at least in part on the one or more valleys during a third time period in order to close the switch, the third time period not overlapping with the first time periods and the second time period.

32. The system controller of claim 31 wherein the second time period is larger than each first time period in duration.

33. The system controller of claim 31 wherein:
the first signal generator is further configured to change the drive signal periodically at a frequency corresponding to a fourth time period; and
the fourth time period includes the first time periods and the second time period.

34. The system controller of claim 31 wherein the third signal generator includes:

a ramp-signal generator configured to generate a ramp signal; and
a first comparator configured to receive the ramp signal and the third signal and output the fifth signal based at least in part on the ramp signal and the third signal.

35. The system controller of claim 34 wherein the first signal generator includes:
a second comparator configured to receive a sixth signal related to the third signal and a seventh signal related to the current and output a comparison signal based at least in part on the sixth signal and the seventh signal; and
an OR gate configured to receive the comparison signal, the fourth signal and the fifth signal and output an eighth signal based at least in part on the comparison signal, the fourth signal and the fifth signal.

36. The system controller of claim 35 wherein the first signal generator further includes a flip-flop configured to receive the second signal and the eighth signal and output the drive signal based at least in part on the second signal and the eighth signal.

37. A method for a power converter, the method comprising:
receiving a first signal; and
outputting a drive signal based at least in part on the first signal;
wherein the outputting the drive signal based at least in part on the first signal includes:
detecting a plurality of valleys of the first signal, the plurality of valleys corresponding to a same demagnetization process;
selecting a valley from the plurality of valleys;
changing a second signal at a time corresponding to the selected valley; and
changing the drive signal based at least in part on the selected valley.

38. A method for a power converter, the method comprising:
receiving a first signal;
changing a second signal;
generating a fourth signal based at least in part on a third signal, the fourth signal indicating a first time period; and
outputting a drive signal based at least in part on the first signal and the fourth signal;
wherein the outputting the drive signal based at least in part on the first signal and the fourth signal includes:
determining one or more valleys of the first signal, the one or more valleys corresponding to one or more demagnetization periods respectively;
changing the second signal at one or more times corresponding to each valley of the one or more valleys;
keeping the drive signal unchanged during the first time period indicated by the fourth signal; and
changing the drive signal based at least in part on the one or more valleys during a second time period, the second time period not overlapping with the first time period.

39. A method for a power converter, the method comprising:
receiving a first signal;
changing a second signal;
generating a fourth signal based at least in part on a third signal, the fourth signal indicating a plurality of first time periods;
generating a fifth signal based at least in part on the third signal, the fifth signal indicating a second time period, the second time period not overlapping with the first time periods; and
outputting a drive signal based at least in part on the first signal, the fourth signal and the fifth signal;
wherein the outputting the drive signal based at least in part on the first signal, the fourth signal and the fifth signal includes:
determining one or more valleys of the first signal, the one or more valleys corresponding to one or more demagnetization periods respectively;
changing the second signal at one or more times corresponding to each valley of the one or more valleys;
keeping the drive signal unchanged during the first time periods indicated by the fourth signal;
keeping the drive signal unchanged during the second time period indicated by the fifth signal; and
changing the drive signal based at least in part on the one or more valleys during a third time period, the third time period not overlapping with the first time periods and the second time period.

* * * * *